US008267602B2

(12) United States Patent
Senba

(10) Patent No.: US 8,267,602 B2
(45) Date of Patent: Sep. 18, 2012

(54) LENS ASSEMBLY, LENS MOVING DEVICE AND ASSEMBLING METHOD

(75) Inventor: Takehiko Senba, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 503 days.

(21) Appl. No.: 12/501,847

(22) Filed: Jul. 13, 2009

(65) Prior Publication Data
US 2009/0273701 A1 Nov. 5, 2009

Related U.S. Application Data

(62) Division of application No. 11/545,631, filed on Oct. 11, 2006, now Pat. No. 7,848,638.

(30) Foreign Application Priority Data

Oct. 11, 2005 (JP) ................................ 2005-296709
Oct. 14, 2005 (JP) ................................ 2005-300435
Nov. 10, 2005 (JP) ................................ 2005-326496

(51) Int. Cl.
G03B 9/02 (2006.01)
(52) U.S. Cl. ........................................ 396/505; 359/739
(58) Field of Classification Search .................. 348/340; 359/739; 396/505
See application file for complete search history.

(56) References Cited

U.S. PATENT DOCUMENTS

| 6,829,011 | B1 * | 12/2004 | Higuchi et al. ............... 348/340 |
| 7,025,513 | B2 * | 4/2006 | Takanashi ...................... 396/454 |
| 7,391,460 | B2 * | 6/2008 | Abe et al. ...................... 348/341 |
| 7,611,296 | B2 * | 11/2009 | Iwasaki et al. ................. 396/505 |
| 2003/0107667 | A1 | 6/2003 | Abe et al. |
| 2004/0258405 | A1 * | 12/2004 | Shiratori et al. ............... 396/458 |
| 2005/0168834 | A1 * | 8/2005 | Matsumoto et al. .......... 359/694 |

FOREIGN PATENT DOCUMENTS

| JP | 8-248283 | 9/1996 |
| JP | 9-33782 | 2/1997 |
| JP | 10-254022 | 9/1998 |
| JP | 2003-149528 | 5/2003 |
| JP | 2005-84654 | 3/2005 |

* cited by examiner

Primary Examiner — Rochelle-Ann J Blackman
Assistant Examiner — Linda B Smith
(74) Attorney, Agent, or Firm — Sughrue Mion, PLLC

(57) ABSTRACT

A lens assembly in a digital still camera has a lens housing. First and second movable lenses/lens groups are contained in the lens housing, and supported in respectively first and second lens holders. A guide rod guides movement of the first and second lenses/lens groups in an optical axis direction with the lens holders. A shutter unit is disposed between the lens holders. A shutter actuator drives the shutter unit. A containing chamber in the lens housing contains the shutter actuator. A first motor is disposed between the guide rod and an inner surface of the lens housing and near to a first surface of the shutter unit, and moves the first lens holder. A second motor is disposed between the guide rod and the containing chamber and near to a second surface of the shutter unit, and moves the second lens holder.

5 Claims, 22 Drawing Sheets

LENS ASSEMBLY, LENS MOVING DEVICE AND ASSEMBLING METHOD

This is a divisional of application Ser. No. 11/545,631 filed Oct. 11, 2006. The entire disclosure of the prior application(s), application Ser. No. 11/545,631 is considered part of the disclosure of the accompanying divisional application and is hereby incorporated by reference.

BACKGROUND OF THE INVENTION

1. Field of the Invention

The present invention relates to a lens assembly, lens moving device and assembling method. More particularly, the present invention relates to a lens assembly, lens moving device and assembling method, in which moving mechanisms for lenses/lens groups can be suitably arranged in an economized space.

2. Description Related to the Prior Art

A digital still camera is an optical instrument in which an image pickup element such as a CCD photographs an object image. An optical system in a lens assembly of the digital still camera includes movable lenses/lens groups. Information of an in-focus position is derived by evaluating an image signal obtained by the image pickup element. The lenses/lens groups are moved according to the in-focus position to focus the optical system, which is an AF (auto focus) device. U.S.P. Pub. No. 2003/107667 (corresponding to JP-A 2003-149528) discloses the digital still camera having the AF device. The digital still camera has a lens moving mechanism, which includes a lens holder and guide rods. The lens holder holds each one of the lenses/lens groups. The guide rods keep the lens holder movable in an optical axis direction. Also, motors are used in the digital still camera. For the AF operation, one of the motors as prime mover finely moves the lens holder in the optical axis direction by conversion of rotation to linear movement for the lens holder.

A widely available type of the digital still camera has a zooming mechanism with which a magnification is changeable by optical zooming. A plurality of the lens moving mechanisms are incorporated in the digital still camera and arranged in the optical axis direction for zooming. A first one of the lens moving mechanisms disposed on the objective side moves an associated one of the lenses/lens groups, for changing the zooming magnification. A second lens moving mechanism disposed on the focal plane side moves one associated lens/lens group, for adjusting the focus.

However, adjustment of the focusing and zooming by use of a plurality of the lens moving mechanisms enlarges the size of the lens assembly due to difficult arrangement of the motors. A body of the digital still camera should be small in view of a compact construction, but cannot be made small in a sufficient manner for intention. It is conceivable to dispose the motors to direct output shafts of the motors toward one another, so as to cope with the shortcoming. However, wiring for each of the motors is required to connect with a control device in the digital still camera, by use of such a line as a flexible wiring board. A problem arises in a complicated structure and a large size of the flexible wiring board.

The lens assembly includes a housing. A positioning hole is formed for positioning the guide rods. There is a difficulty in known assembly of the lens assembly. Recognition of the positioning hole before inserting the guide rods is not very easy with human eyes, to make it considerably difficult to assemble the lens assembly. Also, the guide rods may strike the inside of the lens housing or edges of the positioning hole during the insertion, to cause scratches or damages on the lens housing due to the use of the guide rods.

An improvement is disclosed in JP-A 8-248283. The lens assembly is provided with an opening, used in the course of assembly of the lens assembly for visually recognizing positions of the guide rods and the positioning hole. Also, an insertion hole for the guide rods is formed with a conical surface in a funnel form, to facilitate the insertion of the guide rods in the lens housing.

However, the assembly of the lens assembly according to JP-A 8-248283 requires observation of the inside of the lens housing through the opening to insert the guide rods in the positioning hole by checking positions of the guide rods and the positioning hole. Accordingly, the operation of the assembly cannot be efficient due to the manual operation, as the assembly of the lens assembly is difficult to automate.

Also, JP-A 10-254022 discloses an aperture stop mechanism, which includes two aperture stop blades, driven electrically to slide in a direction crosswise to the optical axis direction, for adjusting an aperture stop. A shutter opening is formed through a base plate of the aperture stop mechanism. The aperture stop blades are disposed on the base plate in a slidable manner. A drive lever for the aperture stop blades converts rotation of the motors into linear movement, which is transmitted to the aperture stop blades to shift the aperture stop blades in directions opposite to one another. Aperture recesses are formed in the aperture stop blades for defining an aperture at the shutter opening, to vary an aperture stop diameter according to an amount of overlapping of the aperture recesses.

The aperture stop mechanism of JP-A 10-254022 has a simple structure and may be produced at a low cost. The aperture stop mechanism is usable also as a shutter device. With the aperture stop mechanism, it is conceivable to combine path changing optics for changing an optical path with a bend. JP-A 9-033782 discloses an example of the path changing optics. Also, JP-A 2005-084654 discloses lens shift as a basis of the path changing optics, including two lenses/lens groups disposed before and after the shutter device and the aperture stop mechanism, and the guide rods for guiding the lenses/lens groups. However, a problem arises in incorporating the aperture stop mechanism in the path changing optics of the known technique. A space of the aperture stop blades required for moving cannot be obtained sufficiently because the guide rods must extend within a region of movement of the aperture stop blades. If the aperture stop mechanism is disposed to cause the aperture stop blades to move in a direction away from the guide rods, a thickness of the image pickup optical system will be too great. A size of the lens assembly cannot be small sufficiently.

SUMMARY OF THE INVENTION

In view of the foregoing problems, an object of the present invention is to provide a lens assembly, lens moving device and assembling method, in which moving mechanisms for lenses/lens groups can be suitably arranged in an economized space.

Another object of the present invention is to provide a lens assembly, lens moving device and assembling method, in which moving mechanisms for lenses/lens groups can be assembled efficiently in a facilitated manner.

Still another object of the present invention is to provide a lens assembly, lens moving device and assembling method, in which a shutter mechanism and lens moving mechanisms can be suitably arranged in an economized space.

In order to achieve the above and other objects and advantages of this invention, a lens assembly has a lens housing, first and second lenses, being movable, contained in the lens housing, and supported in respectively first and second lens holders, and a guide rod for guiding movement of the first and second lenses in an optical axis direction with the first and second lens holders. The lens assembly includes a shutter unit disposed between the first and second lens holders. A shutter actuator drives the shutter unit. A containing chamber in the lens housing contains the shutter actuator. A first actuator is disposed between the guide rod and an inner surface of the lens housing and near to a first surface of the shutter unit, for moving the first lens holder. A second actuator is disposed between the guide rod and the containing chamber and near to a second surface of the shutter unit, for moving the second lens holder.

Furthermore, a guide recess is formed in each of the first and second lens holders, for receiving insertion of the guide rod in a slidable manner.

The lens housing includes a first inner surface, disposed to extend substantially in parallel with the optical axis direction, and having one portion where the containing chamber is located. A second inner surface is disposed to extend substantially in parallel with the optical axis direction, and crosswise to the first inner surface. Through holes is formed through the inner surface, for passing terminals of the first and second actuators and a terminal of the shutter actuator, to protrude externally.

Furthermore, a detector is disposed between the guide rod and the second inner surface, for detecting a position of each of the first and second lens holders. A through hole is formed through the second inner surface, for passing a contact of the detector to protrude externally.

In one preferred embodiment, the lens housing has a box or barrel shape.

Furthermore, through holes are formed through an inner surface of the lens housing, for passing terminals of the first and second actuators and a terminal of the shutter actuator, to protrude externally.

Furthermore, a detector is disposed between the guide rod and the inner surface, for detecting a position of each of the first and second lens holders. A through hole is formed through the inner surface, for passing a contact of the detector to protrude externally.

The first and second actuators are motors.

Also, a lens assembly includes plural movable lens components supported in respectively lens holders. A guide rod guides movement of the lens components in an optical axis direction with the lens holders. A lens housing contains the plural lens components and the guide rod. The lens housing includes a body, having an opening formed to open in a direction crosswise to the optical axis direction, and passable by the guide rod and the plural lens components assembled thereon. A first support portion supports the guide rod on the body. A lid closes the opening.

Furthermore, a lens moving mechanism moves the plural lens components.

The lid includes a regulator for limiting movement of the guide rod toward the opening upon closing the opening by fitting.

Furthermore, there is a shutter unit. A second support portion is formed with the lens housing, for supporting the shutter unit. The shutter unit is set on the second support portion while assembled with the guide rod.

The first support portion retains two ends of the guide rod.

The guide rod is constituted by at least first and second guide rods, and the first support portion is constituted by at least two first support portions.

The lens housing includes a guide portion for introducing the guide rod from the opening to the first support portion.

The guide portion is a guide channel formed to extend toward the first support portion.

The guide channel has a width substantially equal to a diameter of the guide rod.

In a preferred embodiment, the guide channel has a width greater than a diameter of the guide rod.

Furthermore, adhesive agent attaches the guide rod to an inside of the guide channel.

The guide channel has an inclined inner surface inclined to increase a channel width from an inner position toward an outer position.

Also, an assembling method of assembling a lens assembly is provided, the lens assembly including plural movable lens components supported in respectively lens holders, a guide rod for guiding movement of the lens components in an optical axis direction with the lens holders, and a lens housing for containing the plural lens components and the guide rod. In the assembling method, the plural lens components are set on the guide rod. The guide rod and the plural lens components are passed through an opening of the lens housing formed to open in a direction crosswise to the optical axis direction. The guide rod is supported on the lens housing with a first support portion. The opening is closed with a lid.

Furthermore, a lens moving device includes a movable lens movable in a direction of an optical axis. A guide rod guides movement of the movable lens on the optical axis. A base panel has a light path opening positioned on the optical axis. First and second interception blades are disposed to overlap with one another on the optical axis, movable in an associated manner in a direction crosswise to the optical axis and between first and second positions, for shutting the light path opening when in the first position, and for opening the light path opening when in the second position. A slot is formed in at least the first interception blade, for receiving insertion of the guide rod, and for allowing the first interception blade to move.

The slot is formed to extend in a predetermined direction to keep the guide rod slidable relatively, for guiding slide of the interception blades in the predetermined direction.

Furthermore, a rail portion is formed with one surface of the base panel, for keeping the interception blades slidable, the light path opening being positioned in a middle of the rail portion.

Furthermore, there is a stationary lens. A fastening surface is formed with an outside of the rail portion, and having the light path opening, for receiving the stationary lens secured thereto.

The movable lens is in each of positions in front of and behind the interception blades with respect to the optical axis direction. The guide rod has a length to guide movement of the movable lens.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
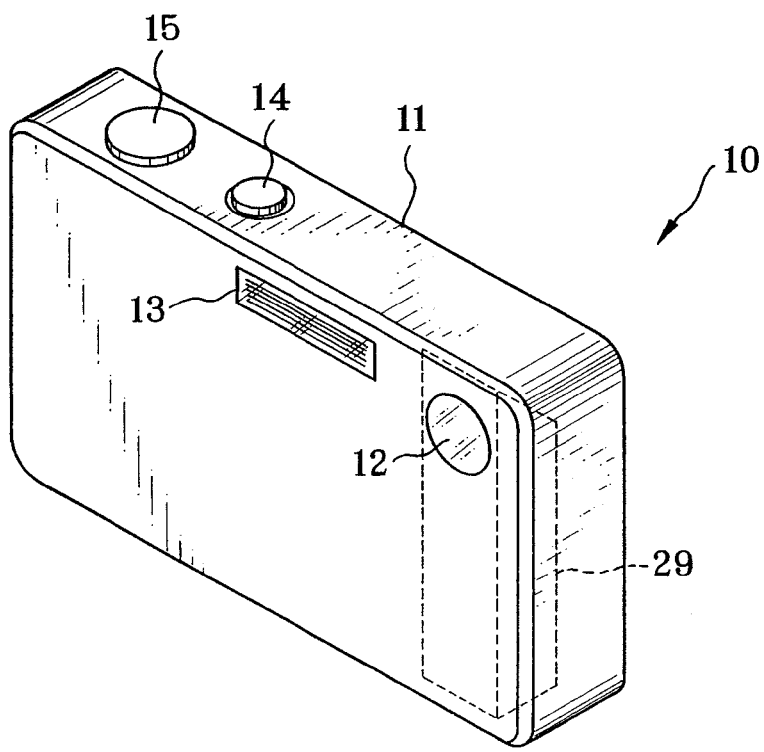
FIG. 1 is a perspective view illustrating a digital still camera.
Figure 2:
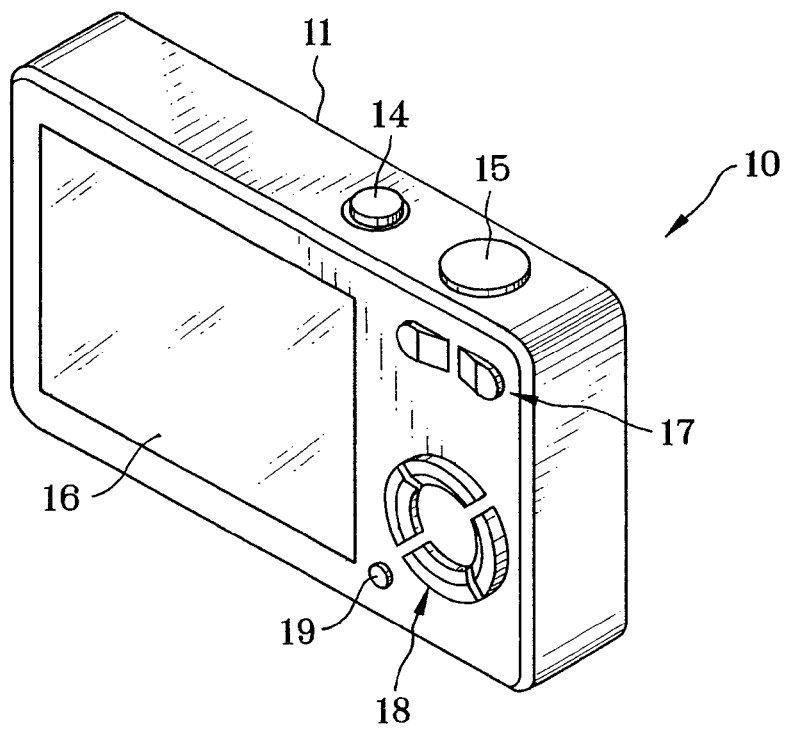
FIG. 2 is a rear perspective view illustrating the digital still camera.

In FIGS. 1 and 2, a digital still camera 10 is illustrated. A camera body 11 has a front face in which a lens opening 12 for photographing and flash light source 13 are disposed. A power button 14 and a shutter button 15 are disposed on an upper face of the camera body 11.

On the rear of the camera body 11 are disposed an LCD display panel 16, a zoom button 17, a cursor button 18, and a mode selection button 19. The mode selection button 19 is operable manually by a user to set a selected one of plural modes, which are a photographing mode to write image data of an image to a memory card, a playback mode to play back an image read from the memory card, and a setup mode for determine various settings.

The LCD 16 is used for playing back images, and also is an electronic viewfinder for displaying a live image in the photographing mode. Also the LCD 16 displays a menu screen region while a setup mode is set. The cursor button 18 is operated for shifting a cursor on the menu screen region and for selecting one of items on the menu screen region. The zoom button 17 is operated to change a zoom magnification.

Figure 3:
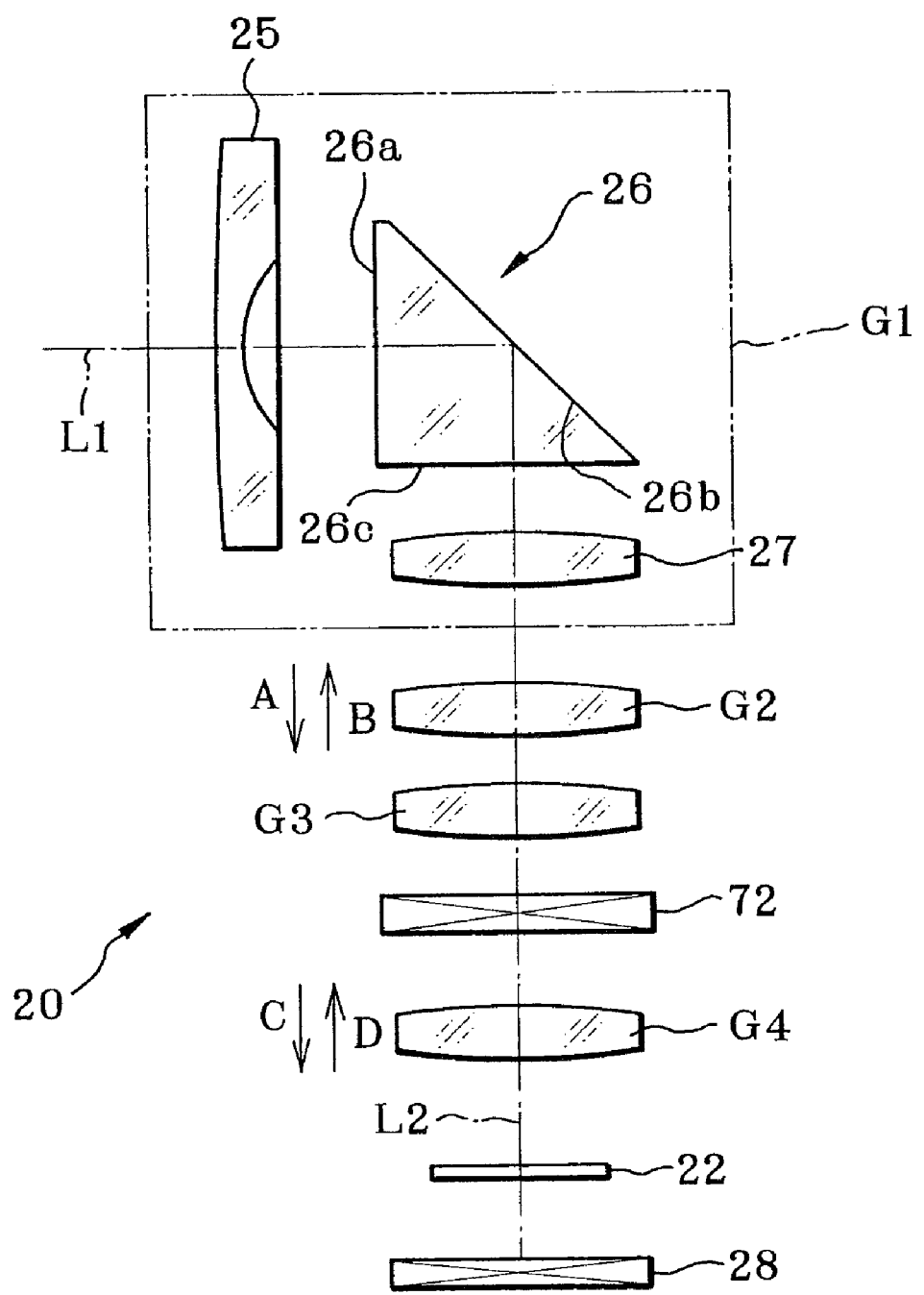
FIG. 3 is an explanatory view in elevation, illustrating an image pickup optical system.

In FIG. 3, an image pickup optical system 20 of a lens assembly used in the digital still camera 10 is illustrated. The image pickup optical system 20 includes first, second, third and fourth lens groups G1, G2, G3 and G4. Also, a rectangular prism is associated with the first lens group G1 for changing an optical path with a bend.

The first lens group G1 includes a first lens element 25, a rectangular prism 26, and a second lens element 27. The first lens element 25 is disposed behind the lens opening 12. An entrance surface 26a of the rectangular prism 26 receives object light passed through the first lens element 25. The rectangular prism 26 has the entrance surface 26a, a reflection surface 26b, and an exit surface 26c. The reflection surface 26b changes a path of object light having traveled on an optical axis L1 of the entrance surface 26a, and directs the object light on an optical axis L2 by a change of an angle of 90 degrees. The exit surface 26c causes the object light to exit to the outside upon reflection on the reflection surface 26b. The second lens element 27 passes the object light on the optical axis L2 from the rectangular prism 26, and directs the object light toward the second lens/lens group G2.

A lens carrier 66 with a lens holder holds the second lens/lens group G2, and varies a magnification of zooming by moving in a direction A or B of FIG. 3. The second lens/lens group G2 may be a single lens element or a lens group having plural lens elements. The third lens group G3 passes object light from the second lens/lens group G2 toward the fourth lens group G4.

Another lens carrier 67 with a lens holder holds the fourth lens group G4, and adjusts the focusing by finely moving in a direction C or D of FIG. 3. There is a low-pass filter 22 through which object light exiting from the fourth lens group G4 is passed. A CCD image sensor 28 is so disposed that the object light from the low-pass filter 22 is focused on a focal plane on the sensor surface. The purpose of the low-pass filter 22 to prevent moire or change in color.

Figure 4:
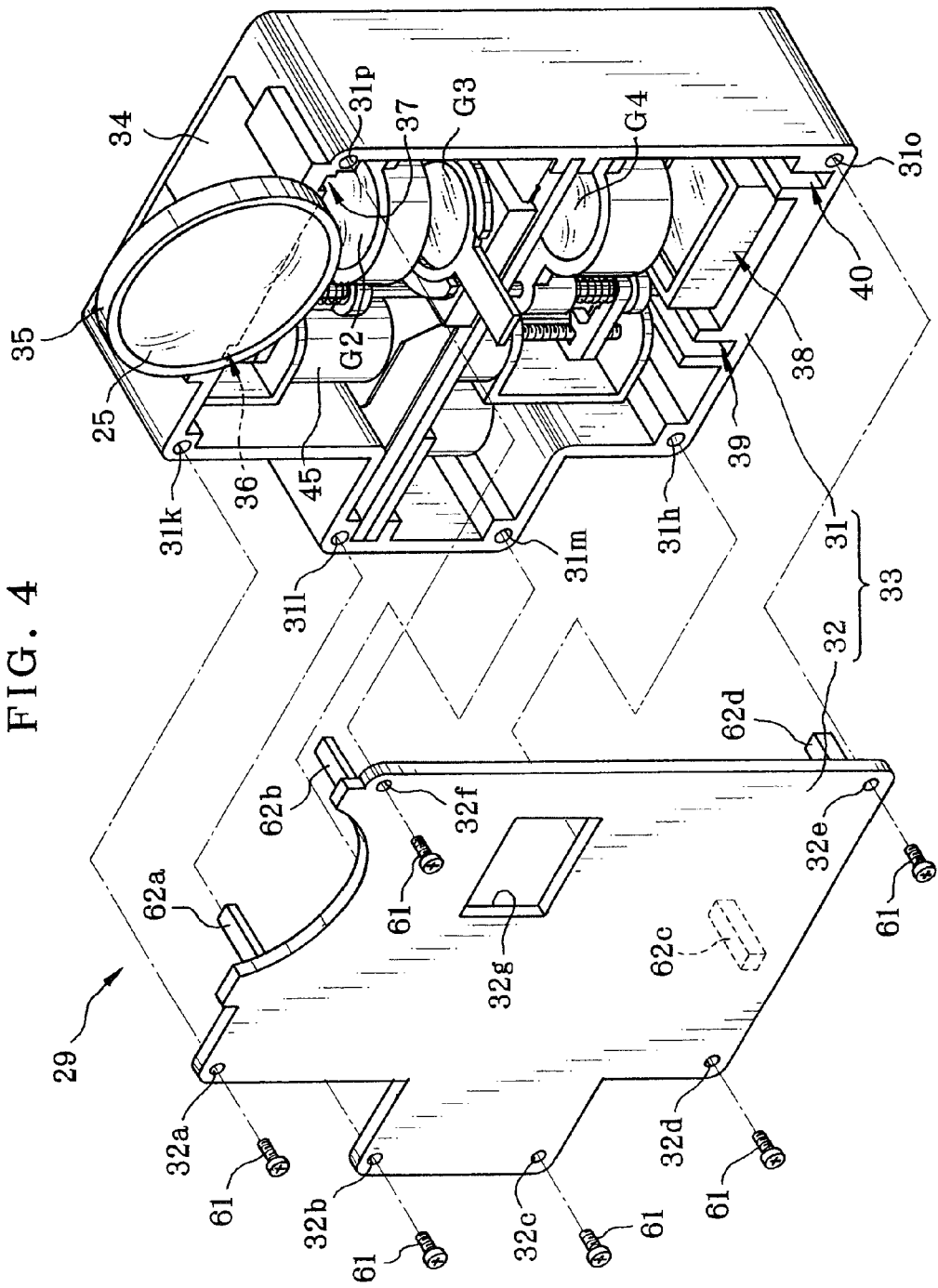
FIG. 4 is an exploded perspective illustrating a lens housing from which a lid is removed.
Figure 5:
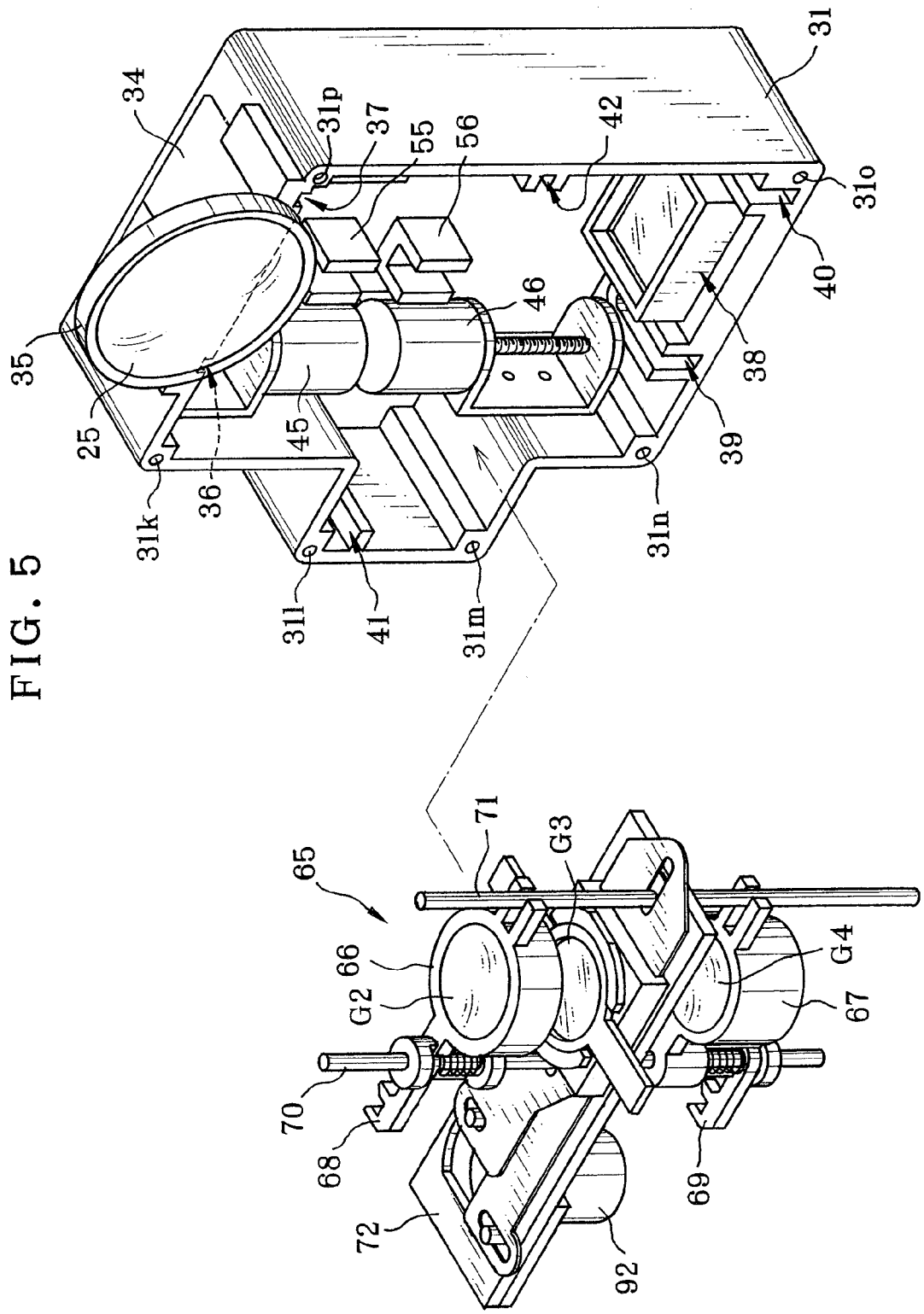
FIG. 5 is an exploded perspective illustrating a state of the lens housing from which a lens moving mechanism is removed.
Figure 6:
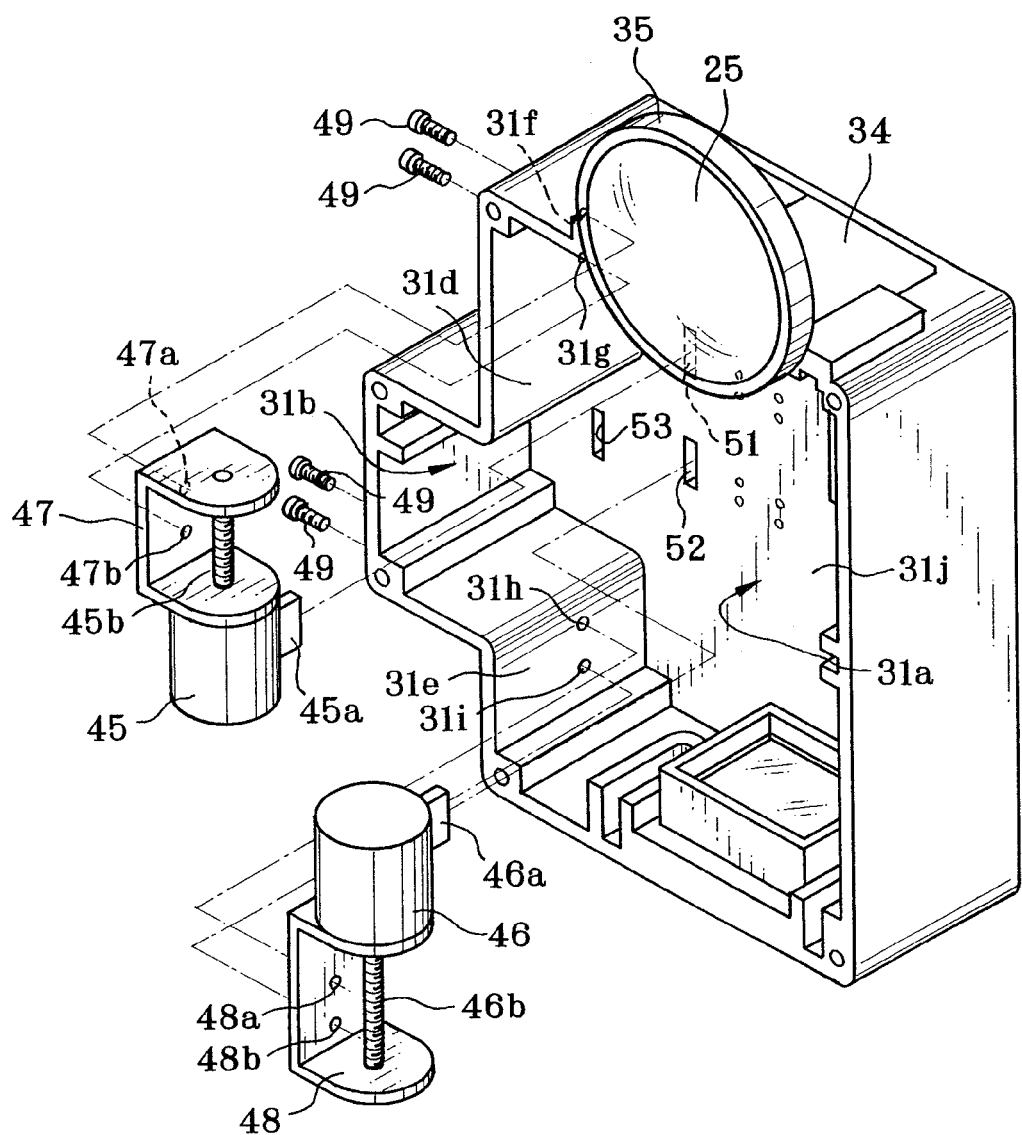
FIG. 6 is an exploded perspective illustrating a state of the lens housing from which motors are removed.

In FIGS. 4, 5 and 6, a lens assembly or lens mount 29 includes a lens housing 33, a zoom motor 45 as first actuator, a focusing motor 46 as second actuator, photo interrupters 55 and 56 as detectors, and a lens moving mechanism 65 as first and second lens moving mechanisms. The lens housing 33 includes a body 31 and a front lid 32 for closing an open side of the body 31.

In FIG. 5, the body 31 of the lens housing 33 has a housing chamber 31a and a containing chamber 31b. The containing chamber 31b is in a containing projecting portion extending from the housing chamber 31a to the left in the drawing. The housing chamber 31a contains the zoom motor 45, the focusing motor 46, the photo interrupters 55 and 56 and the lens moving mechanism 65. There is a shutter unit 72. A shutter motor 92 as shutter actuator drives the shutter unit 72, and is contained in the containing chamber 31b.

A prism containing chamber 34 is formed in the body 31 of the lens housing 33 for containing the rectangular prism 26. A lens holder 35 is formed on the body 31 for holding the first lens element 25. Guide channels 36 and 37 are formed in lateral portions of the prism containing chamber 34. Guide rods 70 and 71 have upper ends inserted in the guide channels 36 and 37.

A CCD frame 38 is disposed low in the body 31 of the lens housing 33 and supports the low-pass filter 22 and the CCD 28 mounted therein. Guide channels 39 and 40 are formed in portions of the CCD frame 38, and positioned to face the guide channels 36 and 37, for insertion of lower ends of the guide rods 70 and 71. Also, rail channels 41 and 42 are formed in the body 31, for positioning the shutter unit 72 in predetermined positions of the body 31 when the lens moving mechanism 65 is contained in the body 31.

An inner surface 31d as first inner surface and an inner surface 31e are defined inside the housing chamber 31a of the body 31 of the lens housing 33. A bracket 47 is associated with the zoom motor 45, which is a prime mover to move the lens carrier 66 in the optical axis direction L2. A bracket 48 is associated with the focusing motor 46, which is a prime mover to move the lens carrier 67 in the optical axis direction L2. Screws 49 are used to fasten the zooming and focusing motors 45 and 46 with the brackets 47 and 48. Holes 31f and 31g are formed in the inner surface 31d of the housing chamber 31a. The screws 49 are helically coupled with screw holes 47a and 47b by passing through the holes 31f and 31g to fasten the bracket 47 on the body 31. Holes 31h and 31i are formed in the inner surface 31e of the housing chamber 31a. The screws 49 are helically coupled with screw holes 48a and 48b by passing through the holes 31h and 31i to fasten the bracket 48 on the body 31. Through holes 51 and 52 are formed in an inner surface 31j of the body 31 as second inner surface. First and second terminals 45a and 46a of the zooming and focusing motors 45 and 46 are inserted in the through holes 51 and 52. A third terminal 92a extends from the shutter motor 92 in the shutter unit 72. A through hole 53 receives insertion of the third terminal 92a.

Figure 7:
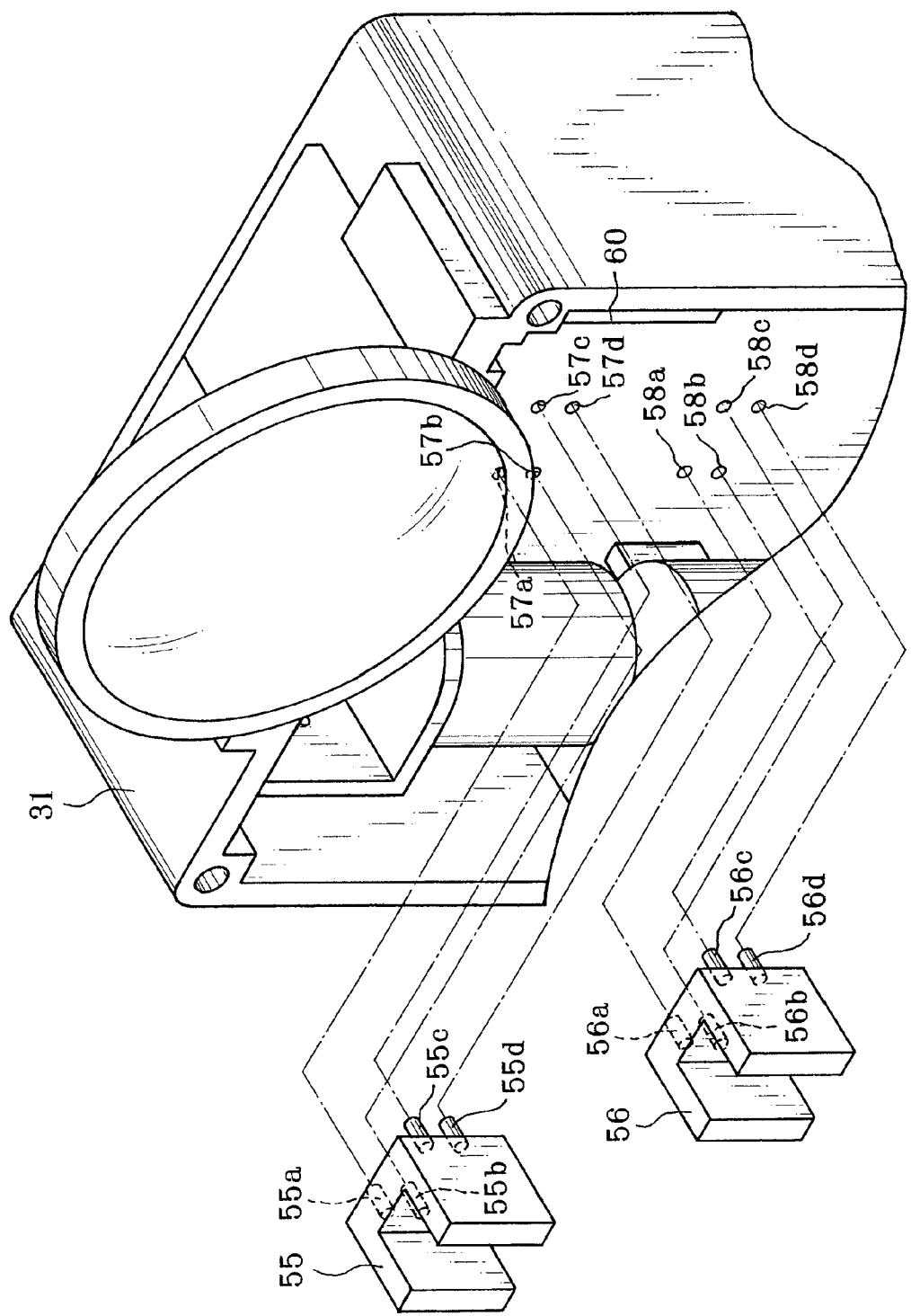
FIG. 7 is an exploded perspective illustrating the lens housing and the photo interrupters.

In FIG. 7, the photo interrupters 55 and 56 are secured to the inner surface 31j of the body 31 of the lens housing 33 fixedly for detecting the reference positions of the lens carriers 66 and 67. Steps of assembly are described now. For the photo interrupter 55, contacts 55a, 55b, 55c and 55d of the photo interrupter 55 are inserted in holes 57a, 57b, 57c and 57d, before the photo interrupter 55 is attached to the body 31 by adhesive agent. For the photo interrupter 56, contacts 56a, 56b, 56c and 56d of the photo interrupter 56 are inserted in holes 58a, 58b, 58c and 58d, before the photo interrupter 56 is attached to the body 31 by adhesive agent. There is an opening 60, in which a position adjusting arm or lever 93b of a lens holder 93 is inserted, which will be described later.

The front lid 32 closes a front opening of the body 31 of the lens housing 33. Screw holes 31k-31p are formed in the body 31. Screws 61 are set in the screw holes 31k-31p to fasten the front lid 32 on the body 31. Holes 32a-32f are formed for receiving insertion of the screws 61. An upper portion of the front lid 32 has a cutout in arc shape, which becomes fitted on the prism containing chamber 34 when the front lid 32 is secured to the body 31.

Regulating projections 62a, 62b, 62c and 62d are formed on upper or lower portions of the front lid 32 and disposed at predetermined intervals. The regulating projections 62a and 62b are inserted in the guide channels 36 and 37 of the body 31 of the lens housing 33, contact upper end faces of the guide rods 70 and 71, and prevent those from offsetting. The regulating projections 62c and 62d are inserted in the guide channels 39 and 40 of the body 31, contact lower end faces of the guide rods 70 and 71, and prevent those from offsetting. There is an opening 32g, through which a position adjusting arm or lever 93a is inserted. A lens holder for the third lens group has the position adjusting arm or lever 93a.

Figure 8:
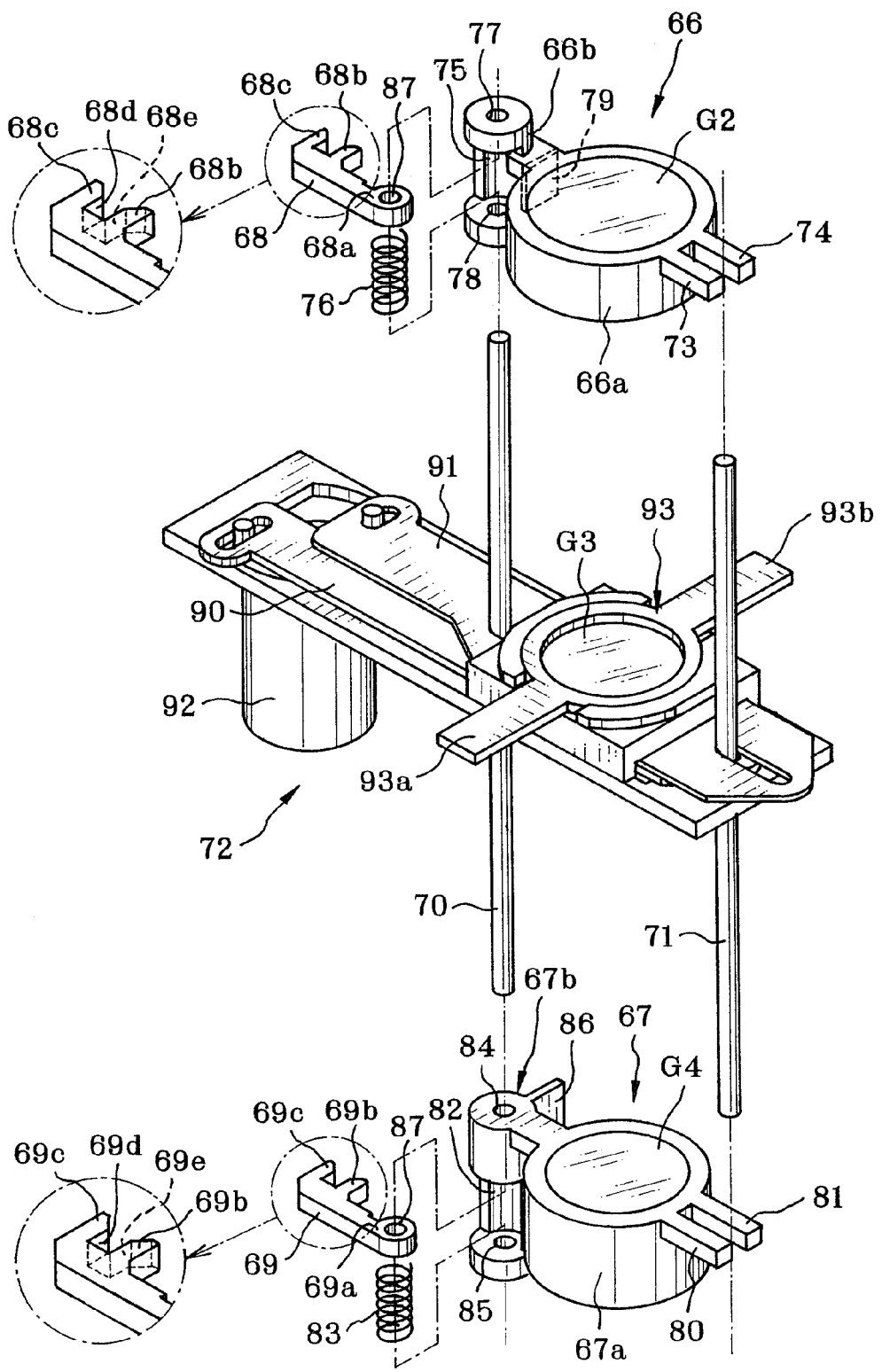
FIG. 8 is an exploded perspective illustrating the lens moving mechanism.

In FIG. 8, the lens moving mechanism 65 is illustrated in a perspective. Movement transmitting panels 68 and 69 as movement transmitting mechanism are included in the lens moving mechanism 65 together with the lens carriers 66 and 67, the guide rods 70 and 71 and the shutter unit 72. A first lens moving mechanism has the movement transmitting panel 68 with the lens carrier 66, the guide rods 70 and 71 on an objective side from the shutter unit 72. A second lens moving mechanism has the movement transmitting panel 69 with the lens carrier 67, the guide rods 70 and 71 on a focal plane side from the shutter unit 72.

The lens carrier 66 includes a lens holder 66a of a ring shape and an insertion ring 66b for insertion of the guide rod 70. The lens holder 66a holds the second lens/lens group G2. Projecting supports 73 and 74 with a guide recess are formed on the lens holder 66a to project at an interval equal to a diameter of the guide rod 71. The guide rod 71 is supported between the projecting supports 73 and 74, which prevents the lens carrier 66 from offsetting during movement.

A containing chamber 75 is formed in the insertion ring 66b. An insertion ring 68a of the movement transmitting panel 68 and a compression coil spring 76 are contained in the containing chamber 75. The compression coil spring 76 cooperates with the insertion ring 68a, and keeps the movement transmitting panel 68 in contact with an upper face of the containing chamber 75. Pivotal holes 77 and 78 as guide recesses are formed in the insertion ring 66b, and receive insertion of the guide rod 70. A detection arm 79 is formed on the insertion ring 66b, and detected by the photo interrupter 55 for recognizing a position of the lens carrier 66.

The lens carrier 67 includes a lens holder 67a and an insertion ring 67b for insertion of the guide rod 70. The lens holder 67a is cylindrical and holds the fourth lens group G4. Projecting supports 80 and 81 with a guide recess are formed with the lens holder 67a, and disposed at an interval equal to a diameter of the guide rod 71. The guide rod 71 is inserted in a space between the projecting supports 80 and 81.

A containing chamber 82 is formed in the insertion ring 67b. An insertion ring 69a of the movement transmitting panel 69 and a compression coil spring 83 are contained in the containing chamber 82. The compression coil spring 83 cooperates with the insertion ring 69a, and keeps the movement transmitting panel 69 in contact with an upper face of the containing chamber 82. Pivotal holes 84 and 85 as guide recesses are formed in the insertion ring 67b, and receive insertion of the guide rod 70. A detection arm 86 is formed on the insertion ring 67b, and detected by the photo interrupter 56 for recognizing a position of the lens carrier 67.

The movement transmitting panel 68 has a shape of a letter F. The insertion ring 68a is at one end of the movement transmitting panel 68 for insertion of the guide rod 70. A hole 87 is formed in the middle of the insertion ring 68a, and receives the guide rod 70. Projecting supports 68b and 68c are formed on a remaining end of the movement transmitting panel 68, and are positioned at a predetermined interval. Threaded walls 68d and 68e of the projecting supports 68b and 68c have racks or female thread. A shifting screw of an output shaft 45b is helically coupled with the racks or female thread.

The movement transmitting panel 69 has a shape of a letter F. The insertion ring 69a is at one end of the movement transmitting panel 69 for insertion of the guide rod 70. The hole 87 is formed in the middle of the insertion ring 69a, and receives the guide rod 70. Projecting supports 69b and 69c are formed on a remaining end of the movement transmitting panel 69, and are positioned at a predetermined interval. Threaded walls 69d and 69e of the projecting supports 69b and 69c have racks or female thread. A shifting screw of an output shaft 46b is helically coupled with the racks or female thread.

The guide rods 70 and 71 are inserted through the shutter unit 72. The lens carrier 66 is moved to pass upper ends of the guide rods 70 and 71 for assembly. The lens carrier 67 is moved to pass lower ends of the guide rods 70 and 71 for assembly. The guide rods 70 and 71 guide the lens carriers 66 and 67 to move in the direction of the optical axis L2.

In the shutter unit 72, two shutter blades 90 and 91 are combined with the shutter motor 92 and a rotating mechanism (not shown) on a drive shaft of the shutter motor 92. When the shutter motor 92 in the shutter unit 72 is supplied with energy, the rotating mechanism rotates to move the shutter blades 90 and 91 in directions reverse to one another. An open area of the exposure opening of the shutter blades 90 and 91 changes to change an aperture stop. When the shutter button 15 is depressed for an exposure, the exposure opening defined by the shutter blades 90 and 91 becomes shut at one time, to intercept object light traveling to the CCD 28. Electric charge is obtained in the CCD 28 by photoelectric conversion, so as to send a sensor output to a control circuit board (not shown). The third lens group G3 is held by the lens holder 93. The position adjusting arms or levers 93a and 93b are included in the lens holder 93 and disposed in a symmetrical manner. The position adjusting arms 93a and 93b protrude externally from the opening 32g of the front lid 32 and the opening 60 of the body 31 of the lens housing 33. The position adjusting arms 93a and 93b are shifted for adjusting the position, and then broken away.

The operation of the construction is described now. The lens assembly or lens mount 29 is produced as follows. In FIG. 6, the zoom motor 45 set in the bracket 47 are assembled in the body 31 of the lens housing 33 at first. The first terminal 45a of the zoom motor 45 is inserted through the through hole 51 formed in the body 31, before the bracket 47 is fastened on the body 31 by the screws 49. Similarly, the second terminal 46a of the focusing motor 46 is inserted through the through hole 52 formed in the body 31, before the bracket 48 is fastened on the body 31 by the screws 49. The second terminal 46a of the focusing motor 46 is kept oriented to protruded in a direction opposite from that of the first terminal 45a of the zoom motor 45.

In FIG. 7, the photo interrupters 55 and 56 are secured to the body 31 after assembling the zooming and focusing motors 45 and 46. The contacts 55a-55d are inserted through respectively the holes 57a-57d before the photo interrupter 55 is attached to the body 31 by adhesion and fixed. For the photo interrupter 56, the attachment of the photo interrupter 55 is repeated.

The assembly of the lens moving mechanism 65 is described now. At first the guide rods 70 and 71 are assembled with the shutter unit 72. The lens carrier 66 with the second lens/lens group G2 is set by moving past the upper ends of the guide rods 70 and 71. The lens carrier 67 with the fourth lens group G4 is set by moving past the lower ends of the guide rods 70 and 71. The guide rod 70 is inserted in the pivotal holes 77 and 78 while the containing chamber 75 of the insertion ring 66b of the lens carrier 66 contains the insertion ring 68a of the movement transmitting panel 68 and the compression coil spring 76. The movement transmitting panel 68 is kept in contact with an upper face of the containing chamber 75 by the bias of the compression coil spring 76. This operation is the same for the lens carrier 66. The lens holder 93 holding the third lens group G3 is set on the shutter unit 72, to obtain the lens moving mechanism 65.

In FIG. 5, the lens moving mechanism 65 is contained in the body 31 of the lens housing 33 where the zooming and focusing motors 45 and 46 and the photo interrupters 55 and 56 have been mounted. An end of the shutter unit 72 on the left side in FIG. 5 is inserted in the rail channel 41 of the body 31. An end of the shutter unit 72 on the right side in FIG. 5 is inserted in the rail channel 42 of the body 31. The shutter unit 72 is pressed into the body 31. An upper end of the guide rod 70 is inserted in the guide channel 36, a lower end of the guide rod 70 being inserted in the guide channel 39. At the same time, an upper end of the guide rod 71 is inserted in the guide channel 37, a lower end of the guide rod 71 being inserted in the guide channel 40. The third terminal 92a of the shutter motor 92 of the shutter unit 72 becomes inserted in the through hole 53 in the body 31 as the lens moving mechanism 65 is disposed in the body 31. The output shaft 45b of the zoom motor 45 is inserted between the projecting supports 68b and 68c of the movement transmitting panel 68. The output shaft 45b is meshed with the racks of the threaded walls 68d and 68e. Similarly, the output shaft 46b of the focusing motor 46 is inserted between the projecting supports 69b and 69c of the movement transmitting panel 69. The screw of the output shaft 46b is meshed with the racks of the threaded walls 69d and 69e.

The front lid 32 is fastened on the body 31 of the lens housing 33 on the front side by use of the screws 61 and other elements. The position adjusting arm or lever 93a of the lens holder 93 becomes protruded from the opening 32g of the front lid 32. The position adjusting arm or lever 93b of the lens holder 93 becomes protruded from the opening 60 of the body 31. After this, the third lens group G3 is adjusted for the position by use of the position adjusting arms or levers 93a and 93b, which are then torn away. Note that the openings 32g and 60 are covered by a lid (not shown). The lens assembly or lens mount 29 is obtained finally.

Figure 9:
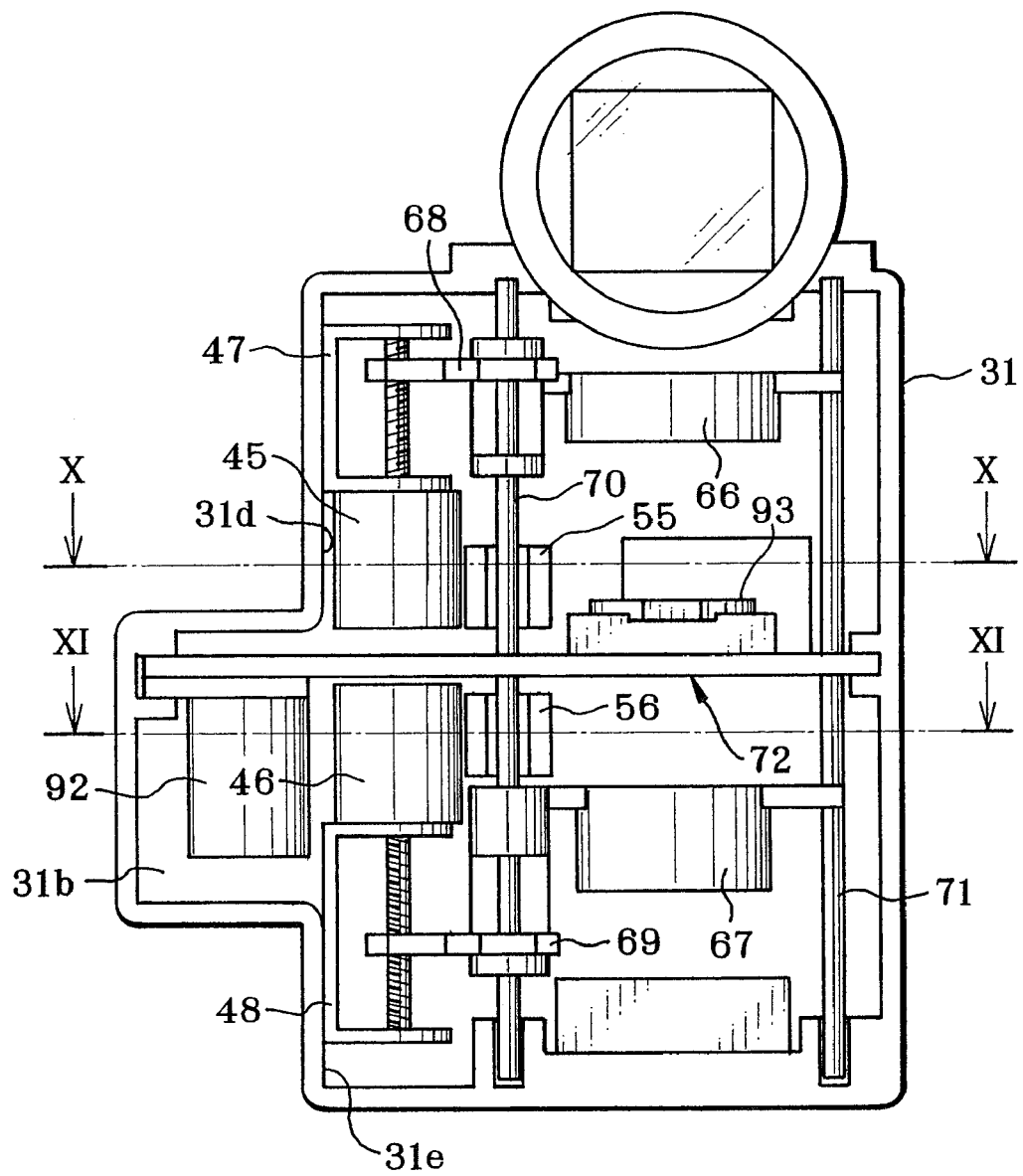
FIG. 9 is an explanatory view in elevation, illustrating the inside of the lens housing from which the lid is removed.
Figure 10:
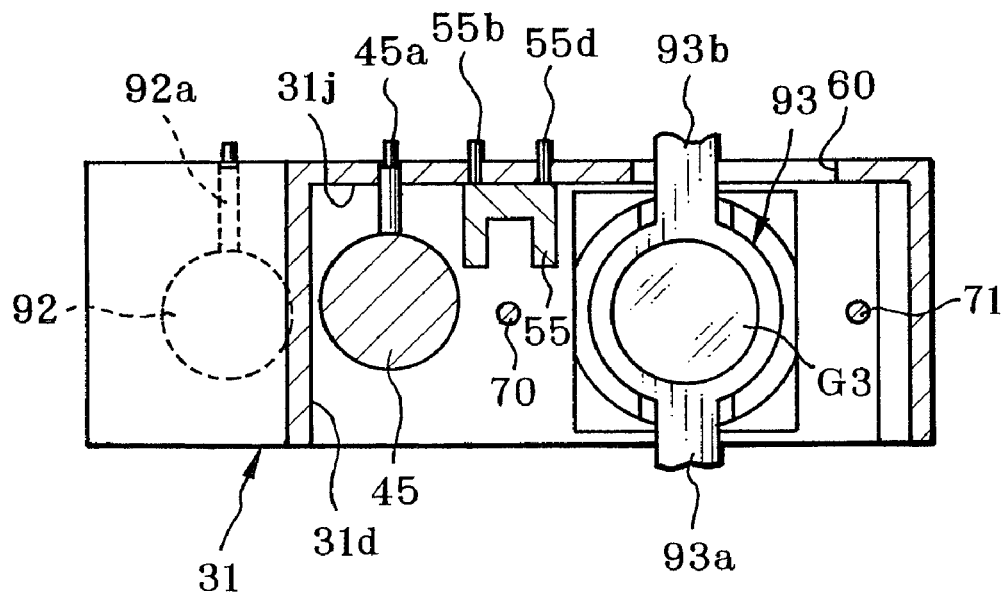
FIG. 10 is a horizontal section taken on line X-X in FIG. 9.
Figure 11:
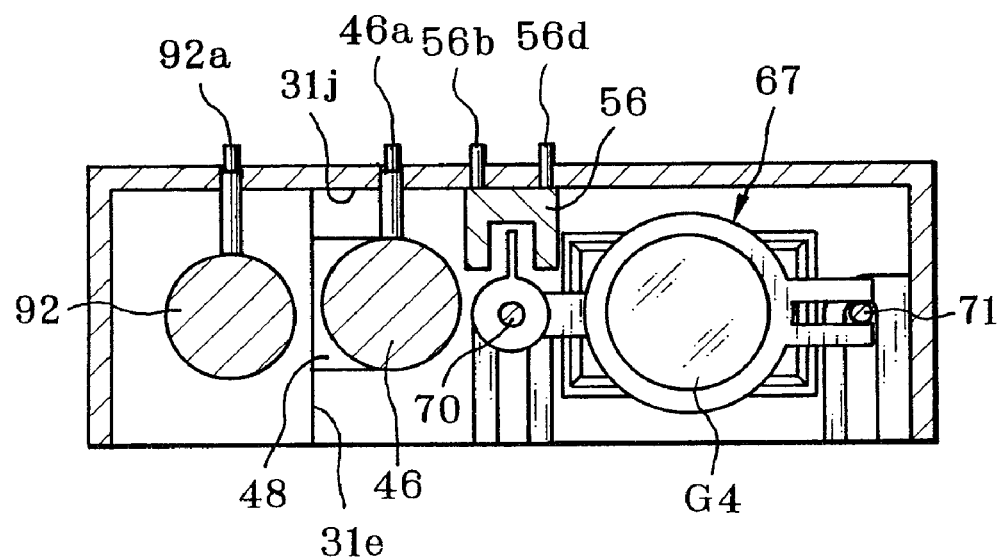
FIG. 11 is a horizontal section taken on line XI-XI in FIG. 9.

In FIGS. 9, 10 and 11, the lens moving mechanism 65 becomes contained in the body 31 of the lens housing 33. The zoom motor 45 is kept retained between the guide rod 70 and the inner surface 31d of the body 31 and near to an upper face of the shutter unit 72. The focusing motor 46 is kept retained between the guide rod 70 and the containing chamber 31b and near to a lower face of the shutter unit 72. The shutter motor 92 is contained in the containing chamber 31b, so the focusing motor 46 is disposed near to the shutter motor 92 of the shutter unit 72. Therefore, the zoom motor 45, the focusing motor 46 and the shutter motor 92 are located near to one another. Note that the zooming and focusing motors 45 and 46 are protruded to the outside of the body 31 through the through holes 51 and 52 in the inner surface 31j of the body 31. The shutter motor 92 is also protruded to the outside of the body 31 through the through hole 53. Thus, the terminals of those can be positioned in a nearly coplanar form.

The photo interrupters 55 and 56 are disposed between the inner surface 31j of the body 31 of the lens housing 33 and the guide rod 70. The contacts 55a-55d are inserted through the holes 57a-57d to protrude to the outside of the body 31. The contacts 56a-56d are inserted through the holes 58a-58d to protrude to the outside of the body 31. So those contacts are positioned coplanarly. The detection arm 79 is formed with the insertion ring 66b of the lens carrier 66, the detection arm 86 being formed with the insertion ring 67b of the lens carrier 67. As the photo interrupter 55 is near to the zoom motor 45 and the photo interrupter 56 is near to the focusing motor 46, contacts of the photo interrupters can be positioned near to terminals of the motors.

Figure 12:
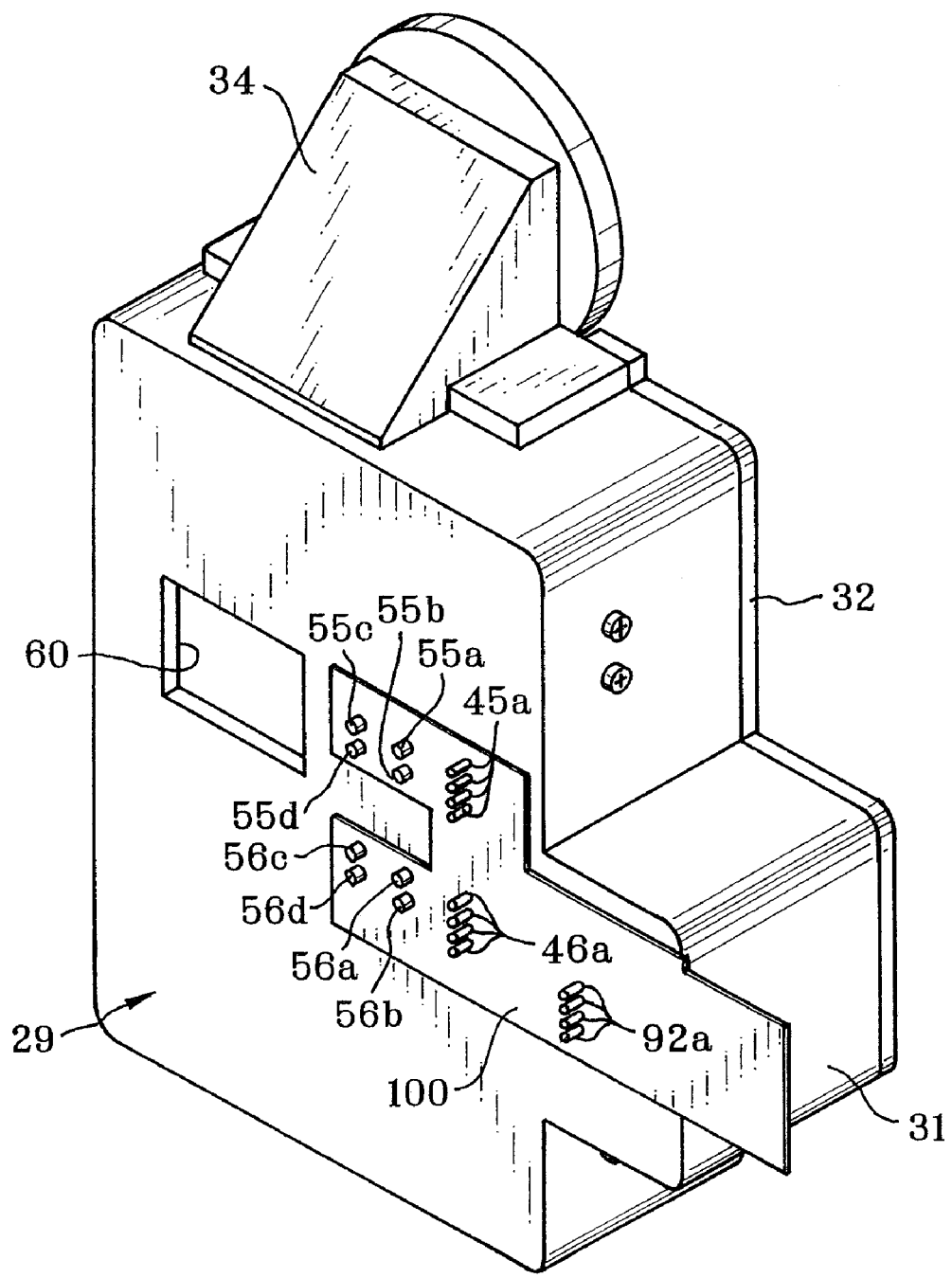
FIG. 12 is a perspective view illustrating the rear of the lens assembly.

In FIG. 12, a circuit board or flexible wiring board 100 is connected with the lens assembly or lens mount 29 for driving and controlling the zoom motor 45, the focusing motor 46 and the shutter motor 92. The first and second terminals 45a and 46a and the third terminal 92a of the zoom motor 45, the focusing motor 46 and the shutter motor 92 are attached by soldering for connection with lines of the circuit board 100 in the rear of the lens assembly or lens mount 29. Also, the contacts 55a-55d and the contacts 56a-56d of the photo interrupters 55 and 56 protrude from the rear of the body 31 of the lens housing 33, and are attached by soldering for connection with the circuit board 100. It is possible for the circuit board 100 to have a relatively small area because of the vicinity in the arrangement of the first and second terminals 45a and 46a and the third terminal 92a, the contacts 55a-55d and the contacts 56a-56d. A circuit structure of the circuit board 100 can be simplified.

Figure 13:
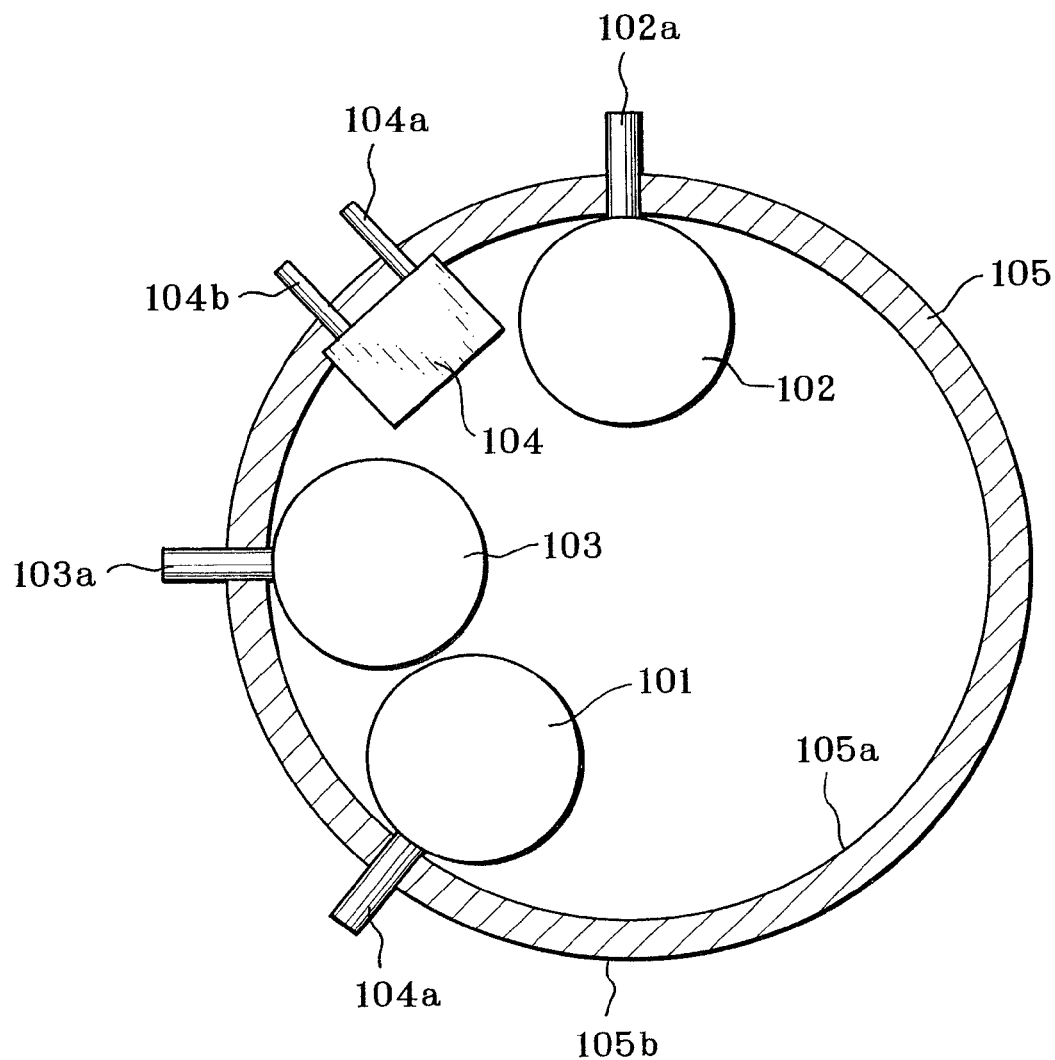
FIG. 13 is a horizontal section illustrating another preferred lens assembly with correlated arrangement of motors.

Unlike the above lens assembly in the box shape, a lens assembly of the invention may be a lens barrel of a cylindrical shape. In FIG. 13, a lens housing 105 of the lens assembly has an inner surface 105a. A shutter motor or actuator 101, a zoom motor or actuator 102, a focusing motor or actuator 103, and a position sensor 104 are arranged on the inner surface 105a. Terminals and contacts protrude through the wall of the lens housing 105, including a terminal 101a of the shutter motor or actuator 101, a first terminal 102a of the zoom motor or actuator 102, a second terminal 103a of the focusing motor or actuator 103, and contacts 104a and 104b of the position sensor 104. The positions of the terminals and contacts are defined on an outer surface 105b of the lens housing 105. This is effective in simply constructing the flexible wiring board for connection of those. An area of the wiring board can be small.

Figure 14:
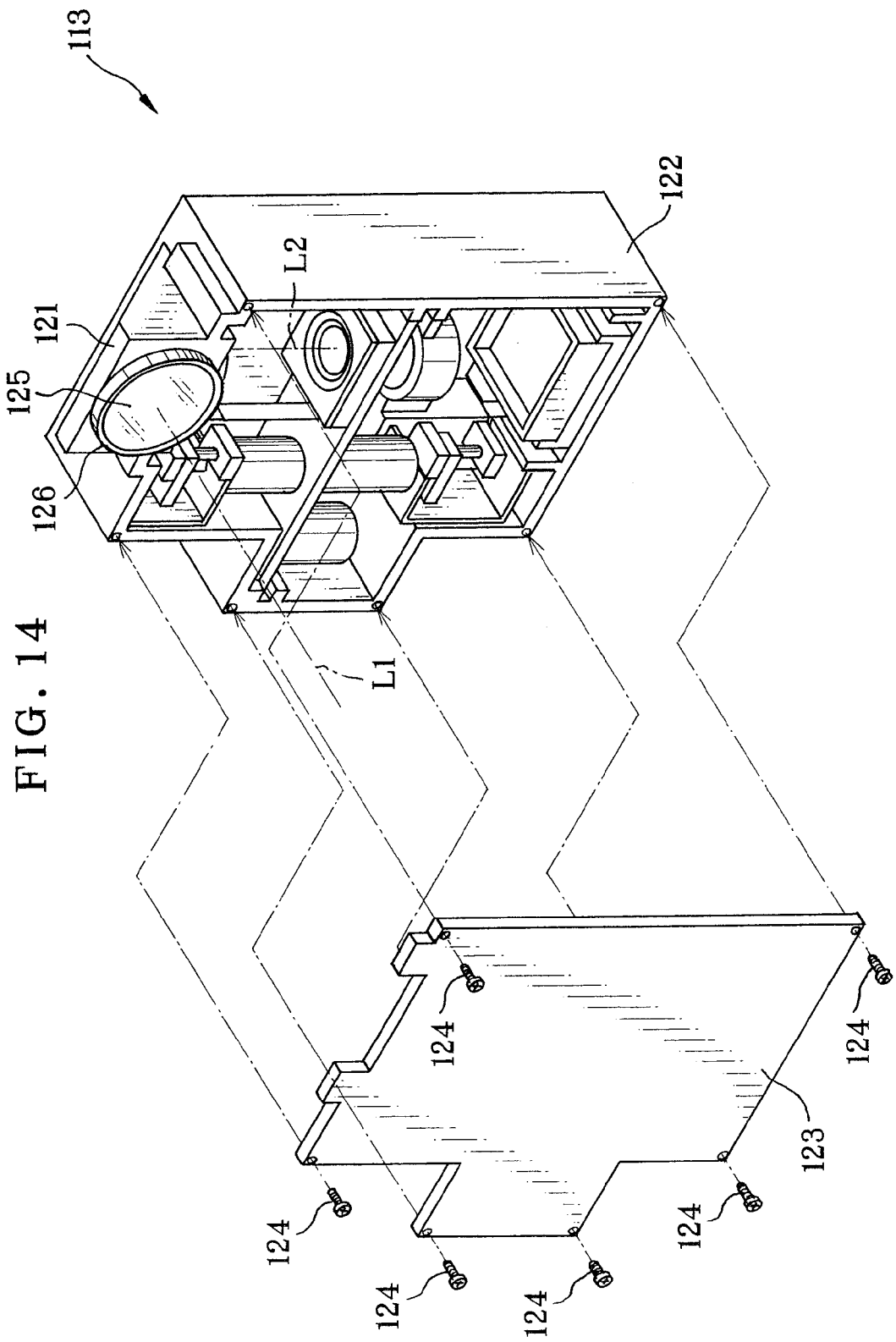
FIG. 14 is an exploded perspective illustrating another preferred lens assembly in which guide rods are kept fixed suitably.

In FIG. 14, another preferred lens assembly or lens mount 113 of a digital still camera is illustrated. The lens assembly or lens mount 113 includes a prism containing chamber 121, a lens housing 122 with a body, and a front lid 123. Screws 124 are used for securing the front lid 123 on the lens housing 122. The prism containing chamber 121 is disposed higher in the lens housing 122. The prism containing chamber 121 is in a form of a triangular frame. A prism (not shown) is contained in the prism containing chamber 121, has a triangular form when viewed in a cross section, and operates to change a light path from the first optical axis L1 to the second optical axis L2 by bending. A first lens carrier 126 with a lens holder is secured to a front face of the prism containing chamber 121. A first lens/lens group 125 is held in the first lens carrier 126. One other lens/lens group (not shown) is disposed under the prism containing chamber 121.

Figure 15:
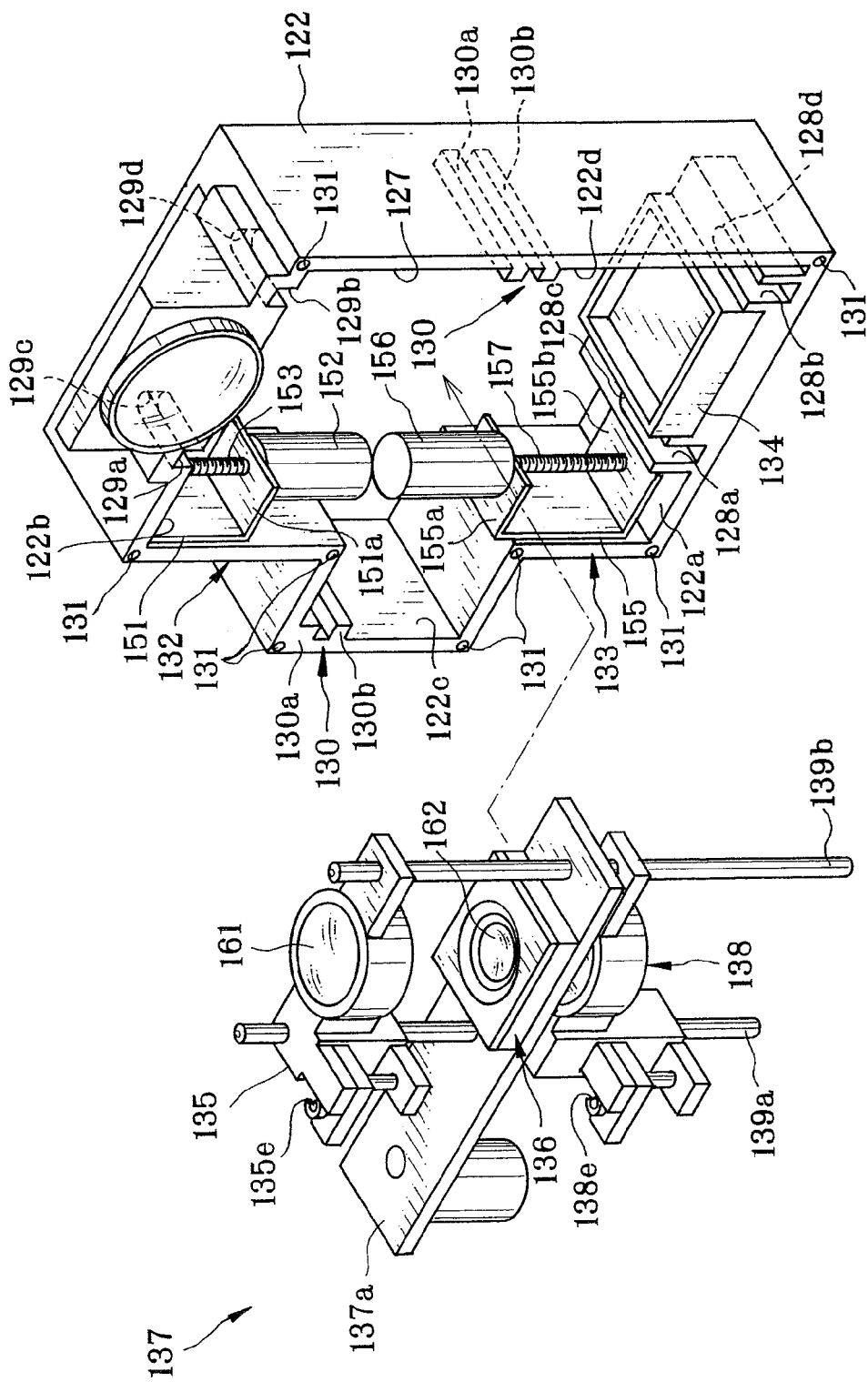
FIG. 15 is an exploded perspective illustrating a lens housing.

In FIG. 15, the lens housing 122 has a shape in combination of a box and a projection disposed laterally on the box. A front opening 127 is open in the lens housing 122. The lens housing 122 has first guide channels 128a and 128b, second guide channels 129a and 129b, and a shutter connector 130 as second support portion. Screw holes 131 are formed in the lens housing 122 for securing the front lid 123. Lens moving mechanisms 132 and 133 and a CCD image sensor 134 are incorporated in the lens housing 122. The lens housing 122 has such a size as to contain a combined component easily, the component including a second lens carrier 135, a third lens carrier 136, a shutter unit 137, a fourth lens carrier 138, and guide rods 139a and 139b.

A lower surface 122a of the inside of the lens housing 122 has the first guide channels 128a and 128b formed therein. A higher portion is formed to protrude from the lower surface 122a in a stepped form. Contact surfaces 128c and 128d as first support portion are included in the higher portion as well as the first guide channels 128a and 128b and a space for supporting the CCD 134.

A size of the first guide channels 128a and 128b is such that no looseness occurs with the guide rods 139a and 139b when the first guide channels 128a and 128b receive insertion of the guide rods 139a and 139b. The contact surfaces 128c and 128d are formed at the inner ends of the first guide channels 128a and 128b, for contact with rod faces of the guide rods 139a and 139b. The contact surfaces 128c and 128d extend in shapes of arcs substantially equal to an arc of the guide rods 139a and 139b. The first guide channels 128a and 128b and the contact surfaces 128c and 128d, when viewed downwards from the upside, are formed in an U shape from the front opening 127 of the lens housing 122 toward the inside. The first guide channels 128a and 128b are so formed that an optical axis of a second lens/lens group 161 and the second optical axis L2 coincide with one another when the guide rods 139a and 139b are inserted deeply.

The inside of the lens housing 122 has an upper surface 122b. The second guide channels 129a and 129b and second contact surfaces 129c and 129d as first support portion are positioned on the upper surface 122b and directly higher than the first guide channels 128a and 128b and the contact surfaces 128c and 128d. In FIG. 15, the second guide channels 129a and 129b and the second contact surfaces 129c and 129d are positioned at the ends of the prism containing chamber 121. The sizes of the second guide channels 129a and 129b are such that, even when the guide rods 139a and 139b are inserted, no looseness occurs on the guide rods 139a and 139b. The second contact surfaces 129c and 129d are defined to extend inwards from the second guide channels 129a and 129b, and come to contact upper end faces of the guide rods 139a and 139b. The second contact surfaces 129c and 129d are formed in a shape of an arc approximately equal to an arc of the rod face of the guide rods 139a and 139b. The second guide channels 129a and 129b and the second contact surfaces 129c and 129d, when viewed upwards from the downside, are in the U shape from the front opening 127 of the lens housing 122 toward the inside. Also the second contact surfaces 129c and 129d are so predetermined for the position that the optical axis of the second lens/lens group 161 coincides with the optical axis L2 upon insertion of the guide rods 139a and 139b.

The shutter connector 130 is associated with inner lateral surfaces 122c and 122d of the lens housing 122, and positions the shutter unit 137 relative to the direction of the second optical axis L2. Rail ridges 130a and 130b in the shutter connector 130 protrude from the inner lateral surfaces 122c and 122d toward the inside of the lens housing 122. When a base panel 137a of the shutter unit 137 is inserted to place the shutter unit 137 in the lens housing 122, the shape of the rail ridges 130a and 130b prevents excessive looseness. The rail ridges 130a and 130b are positioned with a sufficient interval.

The lens moving mechanism 132 is disposed on the left upper portion of the lens housing 122, and is constituted by a first bracket 151 and a first motor or actuator 152. The first bracket 151 is produced from the plate and obtained by bending the plate in a channel shape. Projecting panels are formed to protrude from upper and lower ends. Insertion holes are formed in the first bracket 151. A first shifting screw 153 is inserted in the insertion holes. The first motor 152 has the first shifting screw 153. A panel 151a for support is disposed higher than the first motor 152. The first shifting screw 153 of the first motor 152 protrudes from the panel 151a toward an upper protrusion (not shown). A screw thread is provided on the first shifting screw 153, and is caused to rotate when the first motor 152 rotates.

The lens moving mechanism 133 is disposed on the left lower portion of the lens housing 122, and is constituted by a second bracket 155 and a second motor or actuator 156. The second bracket 155 is produced from the plate and obtained by bending the plate in a channel shape. Panels 155a and 155b for support are formed to protrude from upper and lower ends. Insertion holes are formed in the panels 155a and 155b. A second shifting screw 157 is inserted in the insertion holes. The second motor 156 has the second shifting screw 157. The panel 155a for support is disposed lower than the second motor 156. The second shifting screw 157 of the second motor 156 protrudes from the panel 155a toward the panel 155b. A screw thread is provided on the second shifting screw 157, and is caused to rotate when the second motor 156 rotates.

Figure 16:
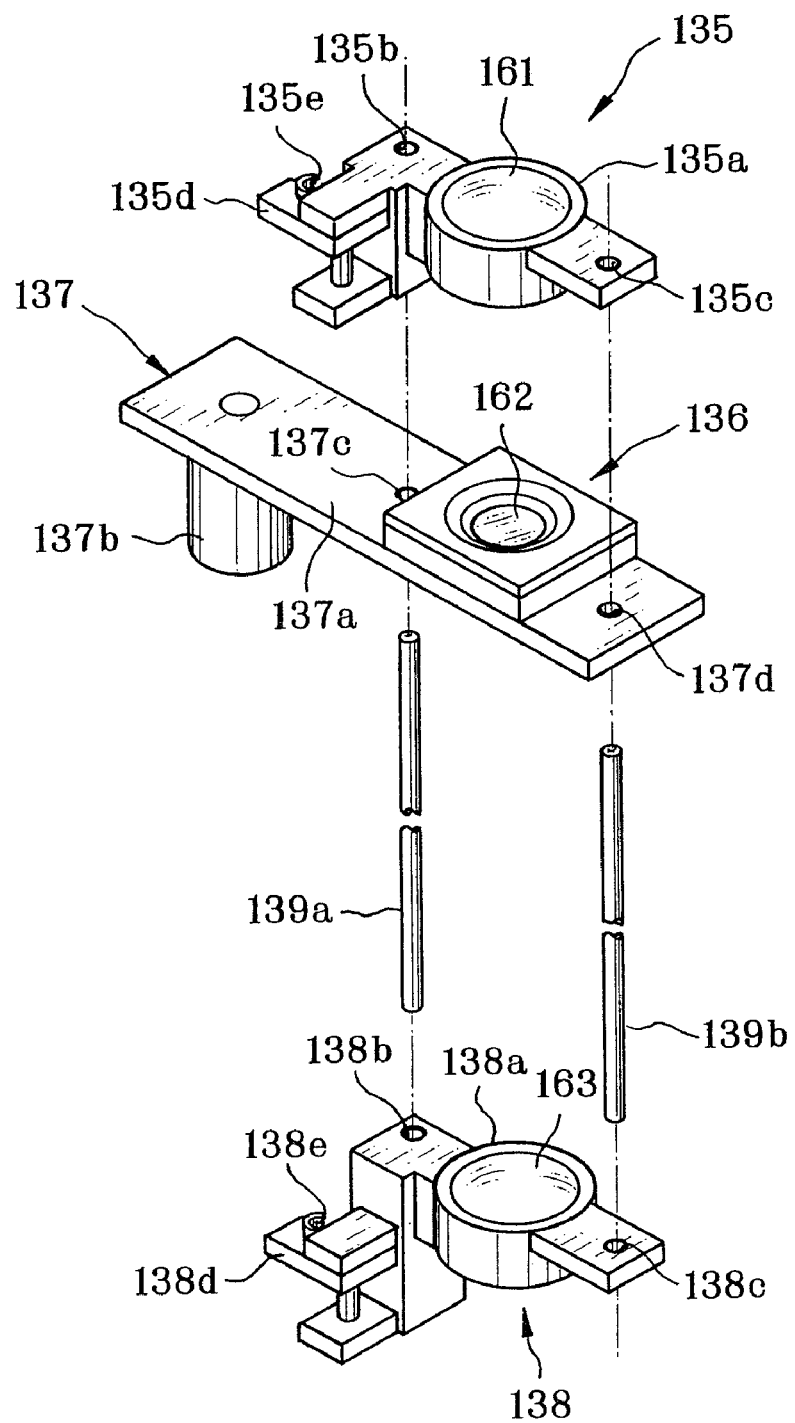
FIG. 16 is an exploded perspective illustrating lens holders and various elements to be contained in the lens housing.

In FIG. 16, the second lens carrier 135 includes a second lens holder 135a in a lens carrier, rod holes 135b and 135c, and a panel 135d for support. The second lens holder 135a holds the second lens/lens group 161. The rod holes 135b and 135c receive insertion of the guide rods 139a and 139b. The panel 135d is coupled with the first shifting screw 153. The second lens holder 135a has a ring shape. The second lens/lens group 161 is secured to an upper portion of the second lens holder 135a. The rod holes 135b and 135c are open in portions of the second lens holder 135a. The sizes of the rod holes 135b and 135c are such that, even when the guide rods 139a and 139b are inserted, no looseness occurs with the second lens carrier 135. A female thread 135e is formed in the hole of the panel 135d, for receiving insertion of the first shifting screw 153 when the second lens carrier 135 is contained in the lens housing 122. The female thread 135e meshed with the first shifting screw 153 helically converts rotation of the first shifting screw 153 into linear movement of the second lens carrier 135 in the direction of the second optical axis L2.

The third lens carrier 136 is disposed higher than the shutter unit 137. A third lens/lens group 162 is held in the middle of the third lens carrier 136. Screw holes (not shown) are formed in the third lens carrier 136 for fastening on the shutter unit 137. The third lens carrier 136 is kept fixed by screws.

A shutter actuator or motor 137b is included in the shutter unit 137 as well as the base panel 137a and a shutter blade (not shown). The third lens carrier 136 is secured to an upper portion of the base panel 137a. The shutter actuator or motor 137b is secured to a lower portion of the base panel 137a. Rod holes 137c and 137d are formed in the base panel 137a for insertion of the guide rods 139a and 139b. The rod holes 137c and 137d have a size enough for inserting the guide rods 139a and 139b with sufficient play.

The fourth lens carrier 138 includes a fourth lens holder 138a in a lens carrier, rod holes 138b and 138c, and a panel 138d for support. A fourth lens/lens group 163 is held by the fourth lens holder 138a. The rod holes 138b and 138c receive insertion of the guide rods 139a and 139b. The panel 138d is coupled with the second shifting screw 157. The fourth lens holder 138a is shaped cylindrically, and provided with the fourth lens/lens group 163 mounted therein. The rod holes 138b and 138c are open in portions of the fourth lens holder 138a. The guide rods 139a and 139b are insertable in the rod holes 138b and 138c, and have such a size that no looseness occurs with the fourth lens carrier 138 upon insertion. A screw hole with a female thread 138e is formed with the panel 138d, and helically engaged with the second shifting screw 157 when the fourth lens carrier 138 is inserted in the lens housing 122. The female thread 138e meshed with the second shifting screw 157 converts rotation of the second shifting screw 157 to movement of the fourth lens carrier 138 in the direction of the second optical axis L2.

The guide rods 139a and 139b are shaped for insertion in the rod holes 135b and 135c, the rod holes 137c and 137d and the rod holes 138b and 138c, and insertion in the first guide channels 128a and 128b and the second guide channels 129a and 129b when contained in the lens housing 122. A length of the guide rods 139a and 139b are such as to be guided by the first guide channels 128a and 128b and the second guide channels 129a and 129b when contained in the lens housing 122.

Figure 17:
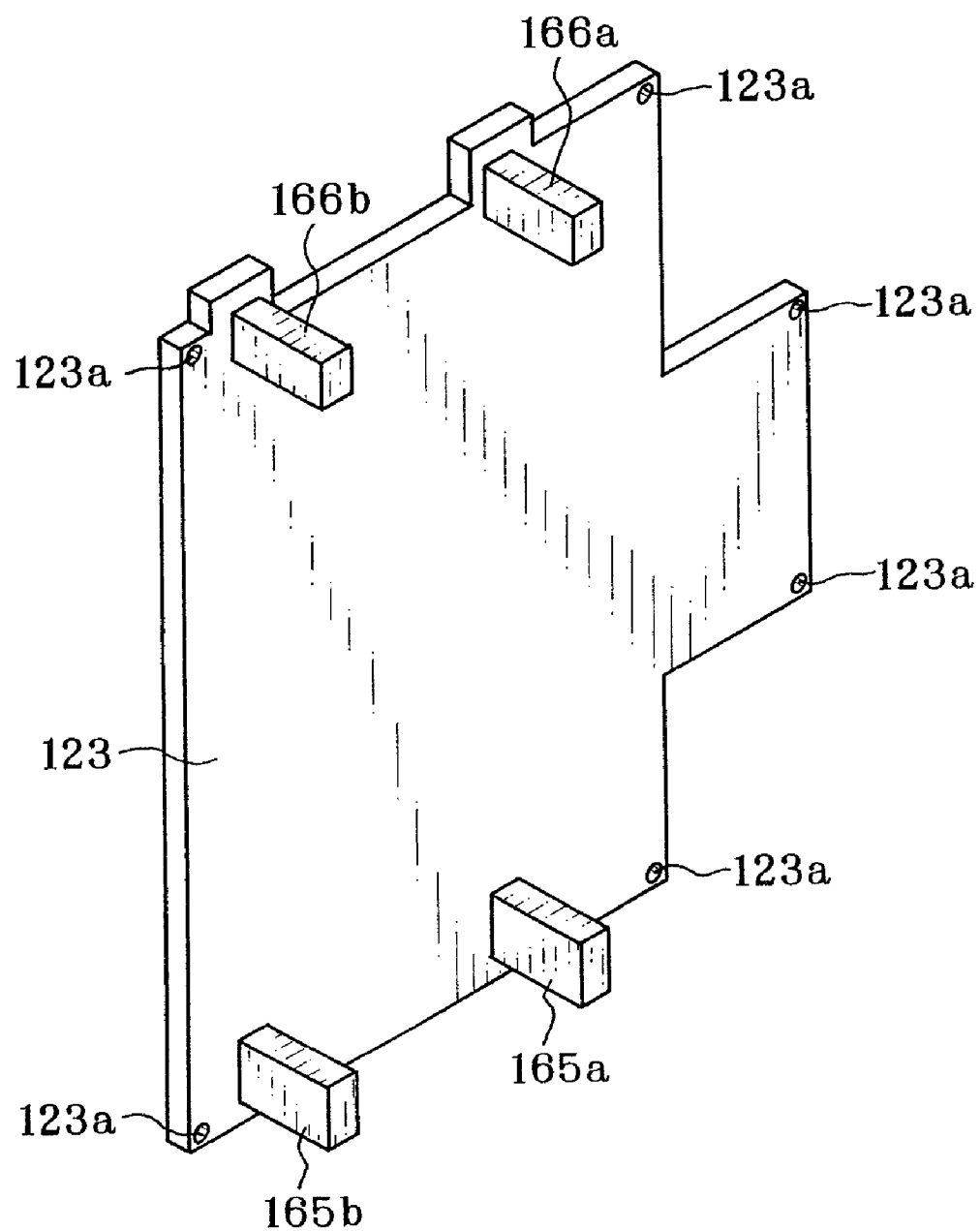
FIG. 17 is a perspective view illustrating the rear of the lid.

In FIG. 17, the front lid 123 is constituted by a panel from which a projection protrudes laterally. Six through holes 123a are formed through the front lid 123 for inserting the screws 124 to fastening on the lens housing 122. Regulators 165a and 165b are formed with the rear of the front lid 123. When the front lid 123 is fitted on the lens housing 122, the regulators 165a and 165b are inserted in the first guide channels 128a and 128b, and press the guide rods 139a and 139b from the side of the front opening 127 of the lens housing 122 for fixation and limiting their movement. Also, regulating projections 166a and 166b are formed higher and with the rear of the front lid 123. When the front lid 123 is fitted on the lens housing 122, the regulating projections 166a and 166b are inserted in the second guide channels 129a and 129b, and press the guide rods 139a and 139b from the side of the front opening 127 of the lens housing 122 for fixation and limiting their movement.

The method of assembling the lens assembly or lens mount 113 is described now. To assemble parts of the lens assembly or lens mount 113, the guide rods 139a and 139b are inserted in holes of the shutter unit 137. The second lens carrier 135 is moved downward to the shutter unit 137 for insertion. The fourth lens carrier 138 is moved upward to the shutter unit 137 for insertion. Thus, the second lens carrier 135 and the fourth lens carrier 138 are assembled.

Then the base panel 137a of the shutter unit 137 is inserted in the shutter connector 130. The guide rod 139a is guided by the contact of its upper end with the first guide channel 128a and its lower end with the second guide channel 129a. The guide rod 139b is guided by the contact of its upper end with the first guide channel 128b and its lower end with the second guide channel 129b. The guide rod 139a comes in contact with the contact surfaces 128c and 129c. The guide rod 139b comes in contact with the contact surfaces 128d and 129d. Thus, the second optical axis L2 can be caused to coincide with the optical axis of the second, third and fourth lenses/lens groups 161-163 by contact of the guide rods 139a and 139b with the contact surfaces 128c and 128d and the second contact surfaces 129c and 129d. After the movement of the guide rods 139a and 139b, the female thread 135e in the panel 135d receives the first shifting screw 153 for helical coupling. The female thread 138e in the panel 138d receives the second shifting screw 157 for helical coupling. When the first shifting screw 153 is caused to rotate by rotation of the first motor 152, the female thread 135e meshed with the first shifting screw 153 moves the second lens carrier 135 in the direction of the second optical axis L2. When the second shifting screw 157 is caused to rotate by rotation of the second motor 156, the female thread 138e meshed with the second shifting screw 157 moves the fourth lens carrier 138 in the direction of the second optical axis L2.

Figure 18A:
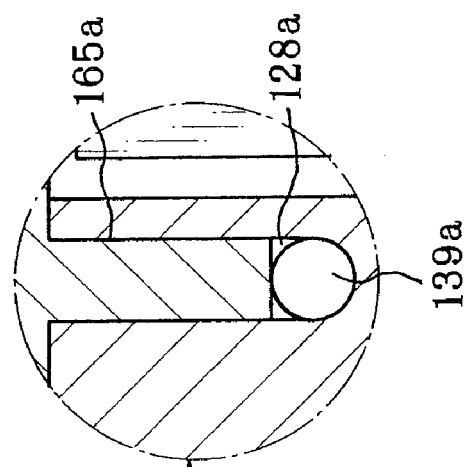
FIGS. 18 and 18A are cross sections illustrating a relationship between a regulator, guide channel, and guide rod.
Figure 18:
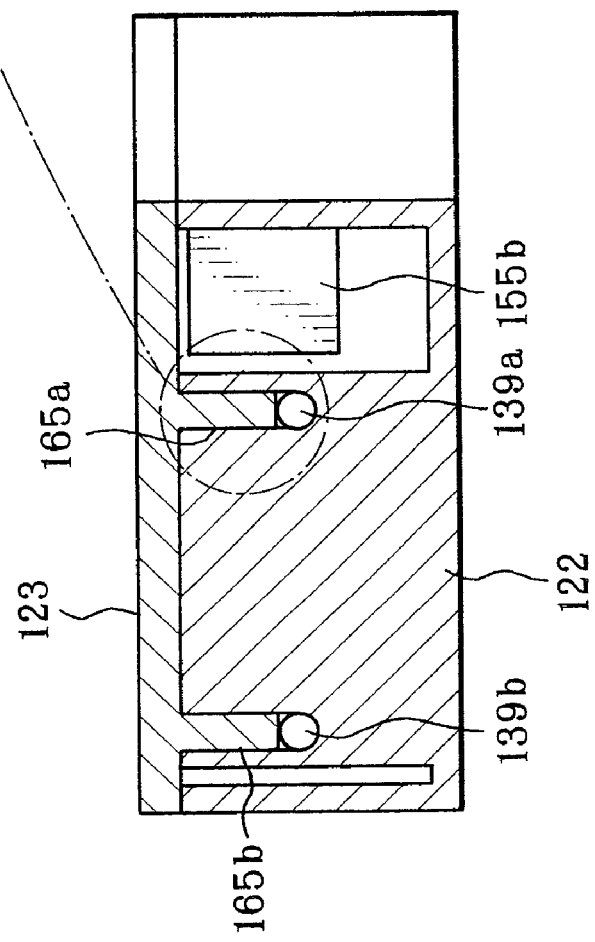

After the second lens carrier 135 is inserted in the lens housing 122, the front lid 123 is fitted to close the front opening 127 of the lens housing 122. In FIGS. 18 and 18A, the regulators 165*a* and 165*b* of the front lid 123 are inserted in the first guide channels 128*a* and 128*b*. The regulating projections 166*a* and 166*b* are inserted in the second guide channels 129*a* and 129*b*. Ends of the regulators 165*a* and 166*a* come to contact a rod face of the guide rod 139*a*. Ends of the regulators 165*b* and 166*b* come to contact a rod face of the guide rod 139*b*. As the screws 124 are fastened to secure the front lid 123, the regulators 165*a* and 166*a* keep the guide rod 139*a* pressed from the front of the lens housing 122. The regulators 165*b* and 166*b* keep the guide rod 139*b* pressed similarly. Thus, the second lens carrier 135 is firmly positioned inside the lens housing 122 by preventing the guide rods 139*a* and 139*b* from offsetting.

Accordingly, the second, third and fourth lenses/lens groups 161-163 and the shutter unit 137 can be positioned only by inserting the lens holder with the guide rods 139*a* and 139*b* through the front of the lens housing 122, because of the positioning with the first and second contact surfaces. The positioning of the second, third and fourth lenses/lens groups 161-163 and the shutter unit 137 is considerably easy because of the insertion into the lens housing 122 through the front opening in the direction vertical to the second optical axis. It is possible to automate containing operation of the second, third and fourth lenses/lens groups 161-163 and the shutter unit 137 into the lens housing 122, to raise efficiency and enable mass production of the lens assembly or lens mount 113 by utilizing machines in a producing line. Also, the guide rods 139*a* and 139*b* become inserted while guided by the first guide channels 128*a* and 128*b* and the second guide channels 129*a* and 129*b*. Damage of the lens housing 122 due to striking of the guide rods 139*a* and 139*b* inside the lens housing 122 can be prevented.

Figure 19:
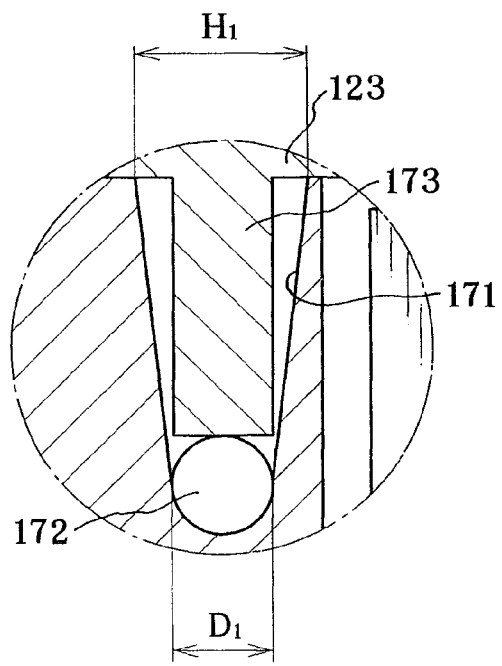
FIG. 19 is a section, partially broken, illustrating another preferred guide channel.

It is possible in the invention to determine the size of the first guide channels 128*a* and 128*b* and the second guide channels 129*a* and 129*b* differently in the manner of FIGS. 18 and 18A. In FIG. 19, one preferred embodiment is illustrated. A guide channel 171 has a V shape as viewed in section. A guide rod 172 has a diameter D1 which is smaller than a width of the width H1 of a front portion of the guide channel 171 of the lens housing 122. This is effective in facilitating insertion of the guide rod 172 in the guide channel 171. Note that a regulating projection 173 may has any suitable shape as viewed in section, for example a rectangular quadrilateral shape or V shape similar to that of the guide channel 171, in view of preventing creation of play with the guide rod 172 when the front lid 123 is fastened with screws.

Figure 20:
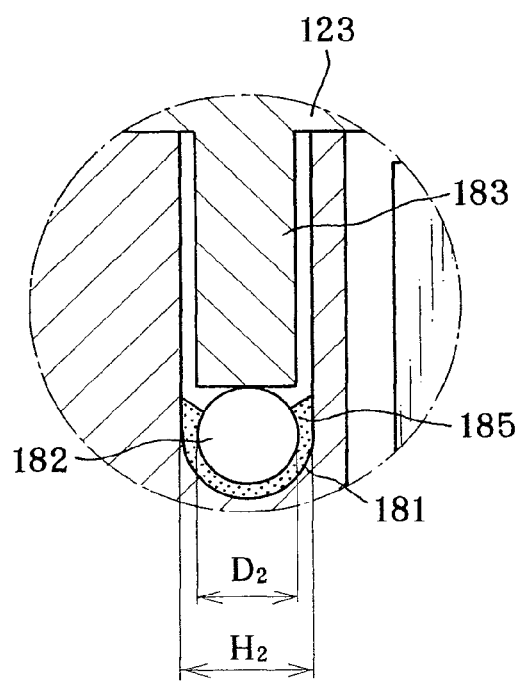
FIG. 20 is a section, partially broken, illustrating one preferred embodiment of a variant contact surface.

In FIG. 20, one preferred combination of a contact surface 181 and a guide rod 182 is illustrated. Let H2 be a width of the contact surface 181. Let D2 be a diameter of the guide rod 182. The contact surface 181 and the guide rod 182 are shaped to satisfy a condition of D2<H2. The shaping of the contact surface 181 is effective in keeping sufficient degree of freedom in adjusting the position of the guide rod 182. Should a difference occur incidentally between the optical axis L2 and any optical axis of the second, third and fourth lenses/lens groups, the difference can be minimized by adjustment. Note that adhesive agent 185 can be applied to surfaces of a space between the guide rod 182 and the contact surface 181 after completing the adjustment. A regulating projection 183 projecting from the front lid 123 can fix the guide rod 182. It is possible to shape the regulating projection 183 in any form if no looseness occurs with the guide rod 182 when the lid is fastened with screw.

Figure 21:
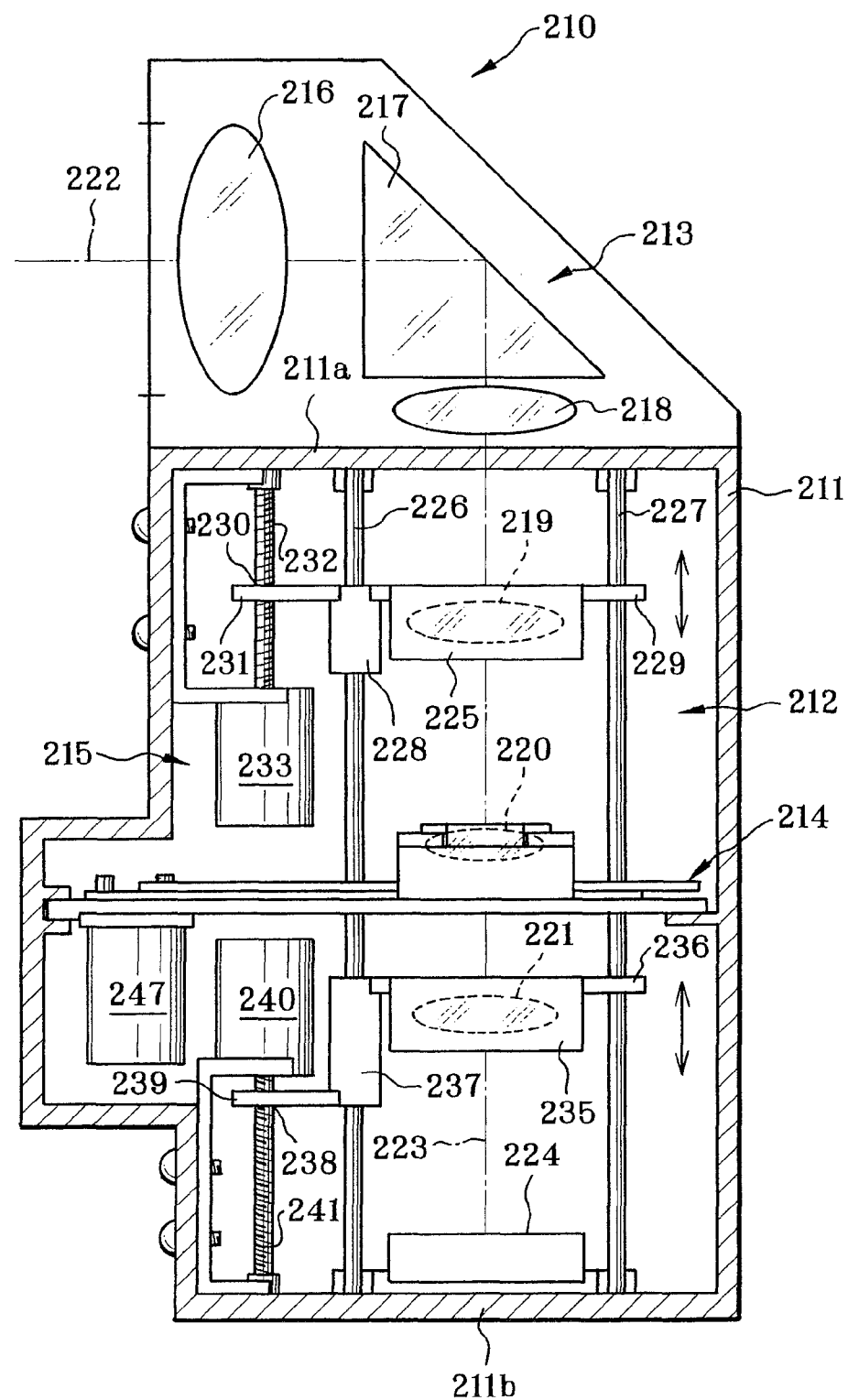
FIG. 21 is a vertical section illustrating an image pickup optical system of another preferred digital still camera.

In FIG. 21, another preferred lens assembly or lens mount 210 is illustrated. A lens housing 211 of the lens assembly or lens mount 210 contains a lens moving mechanism, CCD image sensor and the like, and can be handled in a unified manner. An image pickup optical system 212 includes path changing optics 213, an aperture stop adjusting shutter mechanism 214, and a lens moving device 215 as lens moving mechanism.

The path changing optics 213 include a first lens/lens group 216, a prism 217, and second, third, fourth and fifth lenses/lens groups 218, 219, 220 and 221 arranged in a sequence from the object side. The aperture stop adjusting shutter mechanism 214 is disposed between the fourth and fifth lenses/lens groups 220 and 221. A first optical axis 222 passes through the center of the first lens/lens group 216. The prism 217 perpendicularly reflects object light having traveled on the first optical axis 222. A second optical axis 223 is defined to pass through the second, third, fourth and fifth lenses/lens groups 218-221, and is perpendicular to the first optical axis 222. The prism 217 directs the object light along the second optical axis 223. A CCD image sensor 224 has a receiving surface on which object light reflected by the prism 217 is focused. The CCD 224 is stationary behind the fifth lens/lens group 221 in relation to the direction of the second optical axis 223. An object image is converted into an image signal. Note that the first optical axis 222 is depicted in the shape bent toward the left for the simplicity of depiction, but is actually bent in the direction vertical to the drawing sheet of FIG. 21.

In the path changing optics 213, the first lens/lens group 216, the second lens/lens group 218 and the fourth lens/lens group 220 are stationary. The third and fifth lenses/lens groups 219 and 221 are movable in the direction of the second optical axis 223. A third lens carrier 225 holds the third lens/lens group 219. A sleeve 228 and a ring 229 for support are formed with the third lens carrier 225. Guide rods 226 and 227 are inserted in the sleeve 228 and the ring 229. The sleeve 228 and the ring 229 are guided for movement by the guide rods 226 and 227 which extend in parallel with the second optical axis 223. The guide rods 226 and 227 are arranged so that the second optical axis 223 lies between those. Upper and lower panels 211*a* and 211*b* of the lens housing 211 keep the guide rods 226 and 227 positioned at their ends.

A panel 231 for support is formed with the sleeve 228 and the ring 229. A screw hole with a female thread 230 is formed in the panel 231. A shifting screw 232 is helically coupled with the female thread 230. A first motor or actuator 233 has an output shaft in connection with the shifting screw 232, and rotates to move the third lens/lens group 219. When the first motor 233 is driven, the third lens/lens group 219 moves in the direction of the second optical axis 223.

A fifth lens carrier 235 holds the fifth lens/lens group 221. A ring 236 and a sleeve 237 for support are portions of the fifth lens carrier 235. In the fifth lens carrier 235, a panel 239 for support has a female thread 238. A shifting screw 241 is an output shaft of a second motor or actuator 240. The shifting screw 241 is helically coupled with the female thread 238, so that rotation of the second motor 240 causes the fifth lens carrier 235 to move in the direction of the second optical axis 223. Note that a focal length of the image pickup optical system 212 varies by moving the third and fifth lenses/lens groups 219 and 221. Focusing of the image pickup optical system 212 is adjusted by moving the fifth lens/lens group 221.

Figure 22:
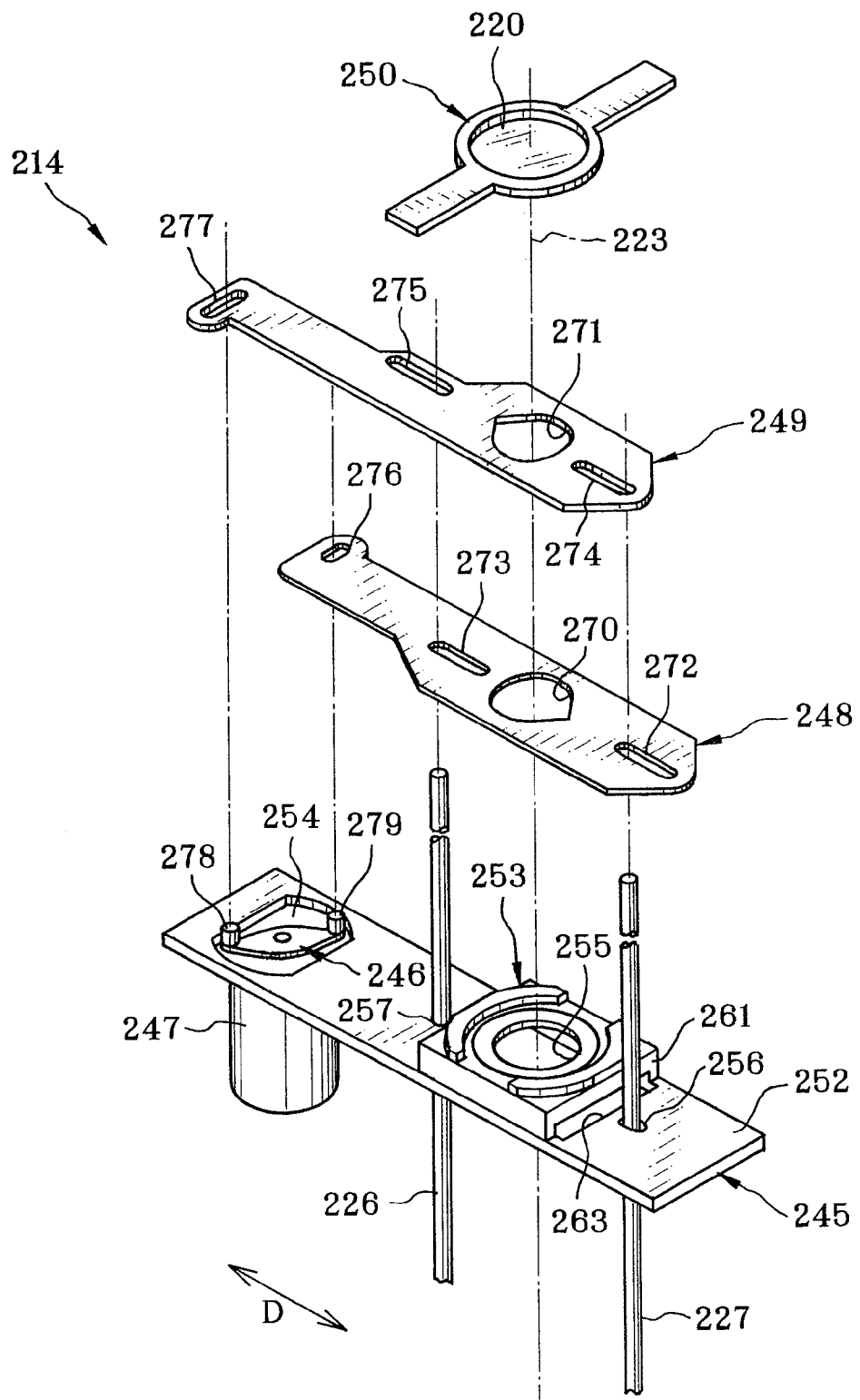
FIG. 22 is an exploded perspective illustrating a aperture stop adjusting shutter mechanism.
Figure 23:
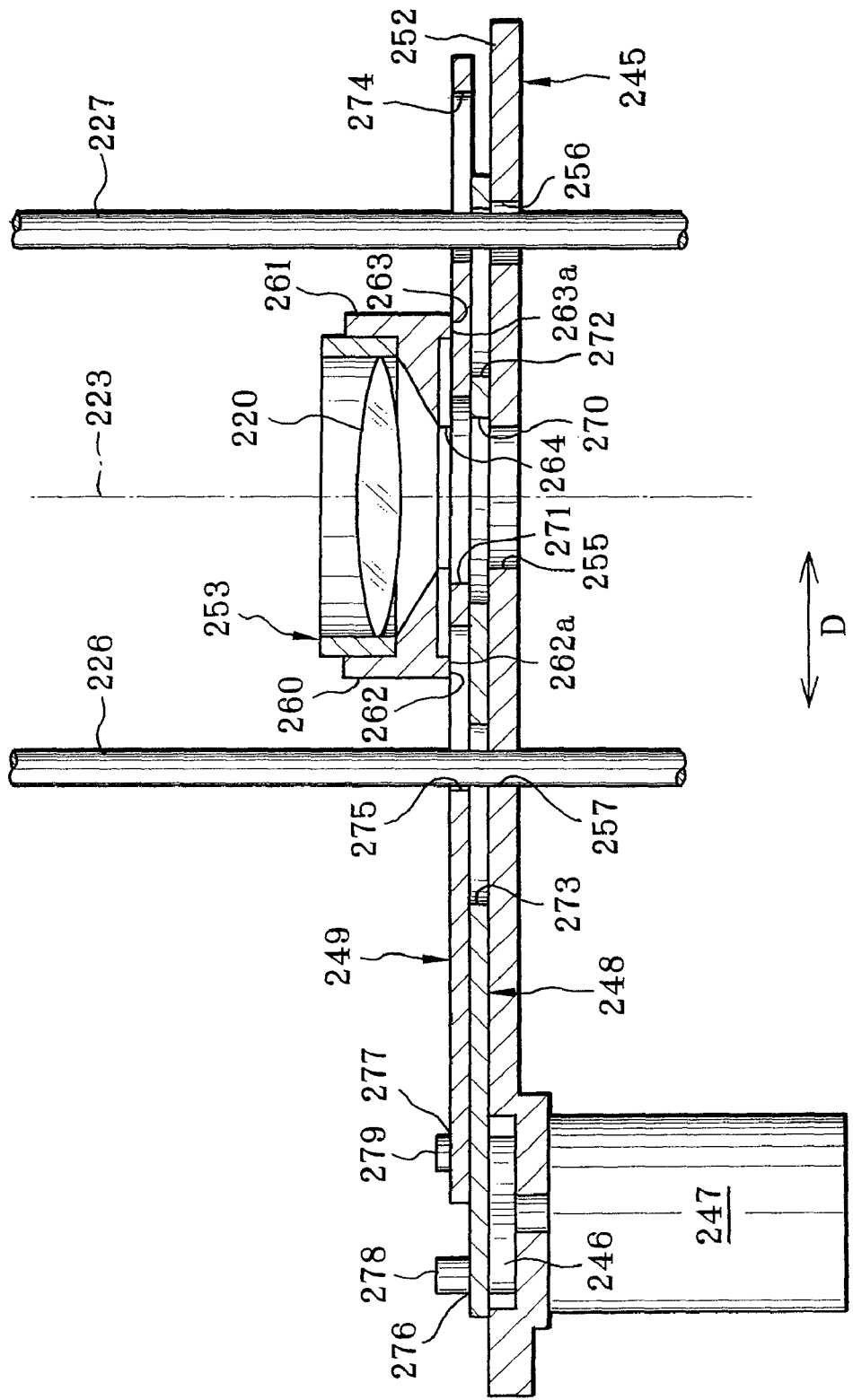
FIG. 23 is a vertical section, partially broken, illustrating the shutter mechanism.

In FIGS. 22 and 23, the aperture stop adjusting shutter mechanism 214 is a unit or composite part, and includes a base panel 245 or shutter panel, a driving lever 246, a motor or actuator 247, a pair of shutter blades or interception blades 248 and 249, and a fourth lens carrier 250 with a lens holder. The base panel 245 extends longitudinally in one direction crosswise to the second optical axis 223. The base panel 245 includes a base surface 252, a fastening block with a fastening surface 253, a recess 254, a shutter opening 255 as light path opening, and a pair of rod holes 256 and 257.

The base surface 252 is contacted by the shutter blade 248 to move. The fastening block 253 is positioned on the second optical axis 223. The rod holes 256 and 257 are formed in the fastening block 253, and receive insertion of the guide rods 226 and 227. The rod hole 257 of those is a positioning hole for contact with the guide rod 226. The rod hole 256 is in a form of stopping the base panel 245 in a rotational manner. Thus, the base panel 245 is positioned by the guide rods 226 and 227 in a first direction D and a second direction perpendicular to the first direction. Note that the lens housing 211 causes the base panel 245 to be positioned in the height direction. The recess 254 is formed on an end of the base surface 252 farther from the second optical axis 223, and is a space for containing the driving lever 246 in a rotatable manner. The shutter opening 255 is disposed on the second optical axis 223, and causes object light to pass behind the shutter blades 248 and 249.

The fastening block 253 has a shape of protruding a support of a rectangular form in the direction along the second optical axis 223 higher than the shutter opening 255 as viewed in a plan toward the front. There are lateral surfaces 260 and 261 of the fastening block 253. Insertion slots or rail slots 262 and 263 are formed in the lateral surfaces 260 and 261 for insertion of the shutter blades 248 and 249 in an overlapped manner. A tunnel or rail portion 264 interconnects the insertion slots 262 and 263. The shutter blades 248 and 249 are kept movable by the insertion slots 262 and 263 in relation to a single direction on the base surface 252. Edges 262a and 263a of the insertion slots 262 and 263 have a level lower than the tunnel or rail portion 264. A size between the base surface 252 and the edges 262a and 263a is equal to or slightly more than a thickness of the shutter blades 248 and 249. Friction between the shutter blades 248 and 249 is reduced. Also, friction between the shutter blade 248 or 249 and the base surface 252 or the edges 262a and 263a is reduced.

The driving lever 246 rotationally shifts between a shut position and an open position, and when in the shut position, causes the actuator 247 to shut the shutter opening 255, and when in the open position, opens the shutter opening 255. A pair of cam pins 278 and 279 are formed with the driving lever 246. The cam pins 278 and 279 extend toward the shutter blades 248 and 249 from both sides beside the rotational axis. The actuator 247 is secured to the rear of the base panel 245. An output shaft of the actuator 247 comes through toward the base surface 252. The driving lever 246 is secured to an end of the output shaft. Note that disposition of the actuator 247 and the driving lever 246 may be opposite to that of the present embodiment as viewed with reference to the base panel 245. This is effective in preventing drop of the shutter blades 248 and 249 and preventing deformation of the shutter blades 248 and 249.

Various openings are formed in the shutter blades 248 and 249, and include first and second aperture stop openings 270 and 271, slots 272, 273, 274 and 275, and cam follower grooves 276 and 277. The slots 272-275 receive insertion of the guide rods 226 and 227, and also are engaged with the guide rods 226 and 227 to guide the shutter blades 248 and 249 to move in the predetermined direction. The cam pins 278 and 279 are engaged with edges of the cam follower grooves 276 and 277.

Figure 24:
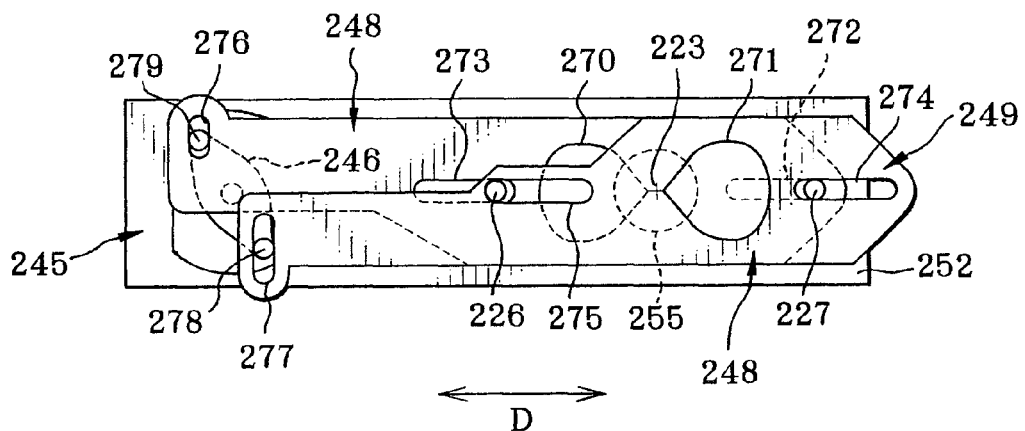
FIG. 24 is a plan illustrating the shutter mechanism in a shut state.
Figure 25:
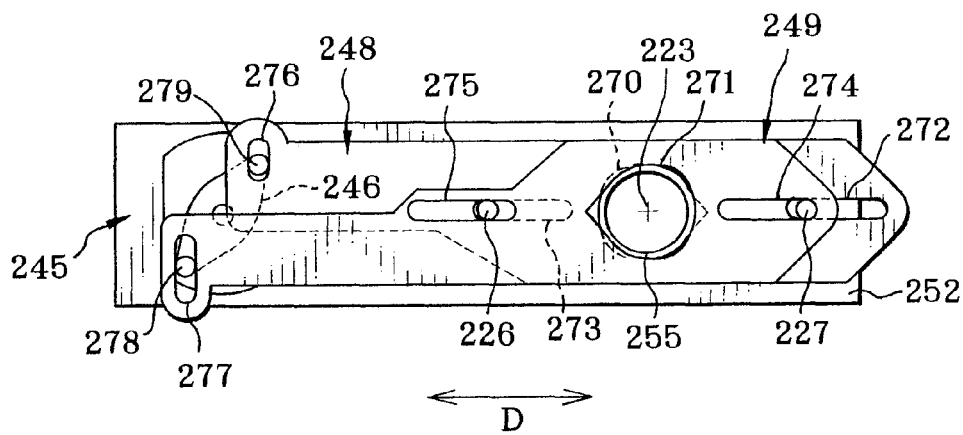
FIG. 25 is a plan illustrating the shutter mechanism in an open state.

In FIG. 24, when the driving lever 246 rotationally shifts to the shut position, the shutter blade 248 is slid in the direction to the left. The shutter blade 249 is slid in the direction to the right. No openness is created by overlapping of the first and second aperture stop openings 270 and 271 at the shutter opening 255. Thus, the shutter opening 255 is shut. In FIG. 25, when the driving lever 246 rotationally shifts to the open position, the shutter blade 248 is slid in the direction to the right. The shutter blade 249 is slid in the direction to the left. The first and second aperture stop openings 270 and 271 come to meet each other by superposition on the shutter opening 255, which becomes open fully.

Figure 26:
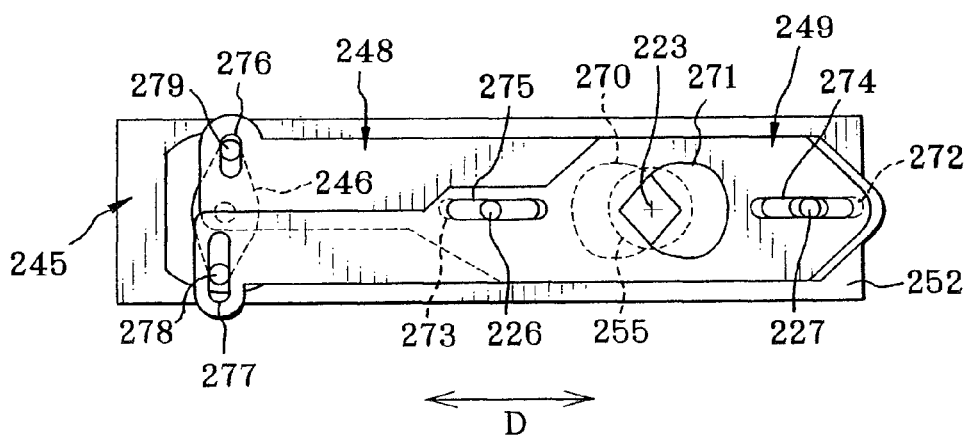
FIG. 26 is a plan illustrating the shutter mechanism with a reduced open area.

In FIG. 26, portions of the first and second aperture stop openings 270 and 271 become overlapped on the shutter opening 255 upon reach of the driving lever 246 to one position between the shut and open positions. The first and second aperture stop openings 270 and 271 determine an aperture stop opening of a smaller diameter than that of the shutter opening 255. The first and second aperture stop openings 270 and 271 are originally in a symmetrical form for the purpose of providing a nearly circular shape in the aperture stop opening as a circle about the second optical axis 223.

Figure 27:
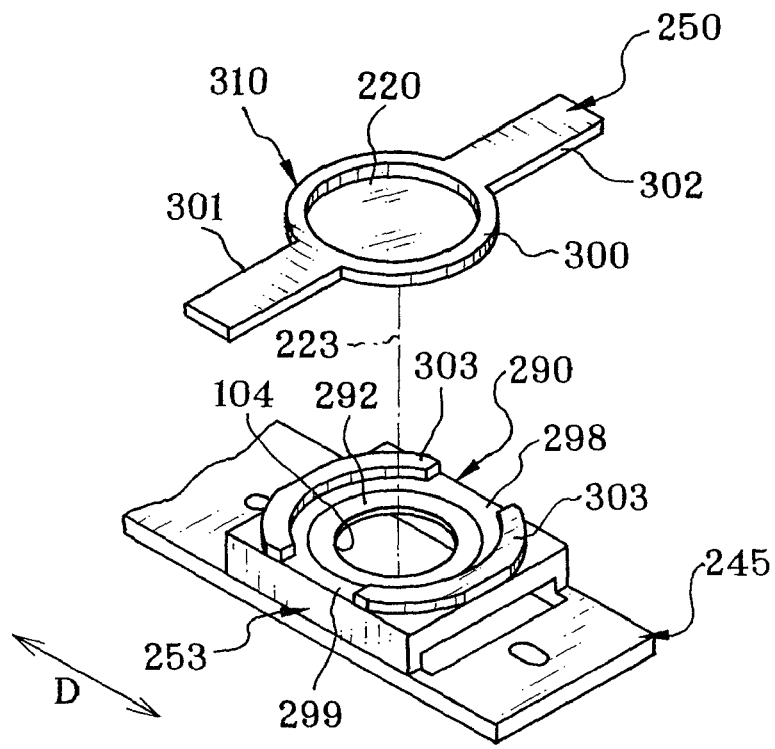
FIG. 27 is an exploded perspective illustrating fitting of a fourth lens holder on a fastening surface.

In FIG. 27, a lens holder 300 is combined with the fourth lens/lens group 220 to constitute the fourth lens carrier 250. The lens holder 300 includes a holder ring 310 and arms 301 and 302. The holder ring 310 holds the fourth lens/lens group 220. The arms 301 and 302 protrude from the holder ring 310 in a direction perpendicular to the one direction D. The lens holder 300 is a single piece of resin formed by molding. The arms 301 and 302 have resiliency, and operate to apply pressure in the course of adjusting eccentricity.

A support block 290 is formed with the fastening block 253 for supporting the fourth lens carrier 250. The support block 290 includes a receiving surface 292, a connection ridge 303, and an aperture 304. The receiving surface 292 contacts and receives the fourth lens carrier 250. The aperture 304 passes object light. The connection ridge 303 protrudes at one step and extends about the holder ring 310. Recessed portions 298 and 299 are formed to cause the arms 301 and 302 to move away.

Figure 28:
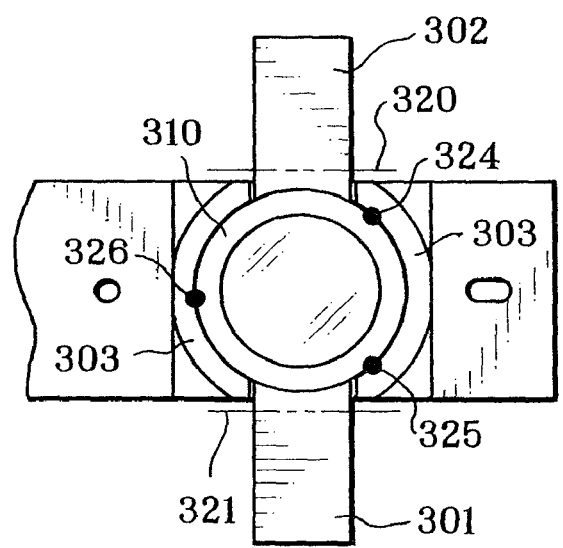
FIG. 28 is a plan illustrating a position of applying adhesive agent and cut positions for cutting adjusting arms.

To secure the fourth lens carrier 250 to the support block 290, at first the fourth lens carrier 250 is inserted downward to the receiving surface 292. The arms 301 and 302 are pressed downwards to adjust the eccentricity. When the position of the fourth lens/lens group 220 is determined, adhesive agent is applied to adhesion positions 324, 325 and 326 between the connection ridge 303 and the lens assembly or lens mount 210. See FIG. 28. The fourth lens/lens group 220 is attached by the adhesion. The number of the adhesion positions may be varied, but can be preferably three or so. After the attachment, the arms 301 and 302 are cut away at lines indicated by cut positions 320 and 321.

In the present embodiment, the slots 272-275 are guide holes for sliding of the shutter blades 248 and 249. However, the slots 272-275 may be holes not contacting the guide rods 226 and 227 for the same purpose. For example, a structure for guiding can be associated with any one of the base panel 245 and the shutter blades 248 and 249 for causing slide of the shutter blades 248 and 249.

In the above embodiment, a shutter mechanism is the aperture stop adjusting shutter mechanism 214. However, a mechanism of the invention may be an aperture stop mechanism, or a shutter mechanism, or a light intercepting mechanism only for intercepting object light in front of an image pickup sensor.

In the above embodiment, the optical path is changed with a bend. However, an optical path of an optical system of the invention may be straight without a bend. In the above embodiment, both of the third and fifth lenses/lens groups 219 and 221 are movable. However, only one of the third and fifth lenses/lens groups 219 and 221 beside the aperture stop adjusting shutter mechanism 214 may be movable.

In the above embodiment, the prism is used for changing the optical path by reflection. However, a mirror can be used for the purpose of changing the optical path instead of the prism. Furthermore, the optical path changing optics may not be used. The optical path may be single and linear without path changing optics. The camera of the embodiment is the digital still camera. However, a camera of the invention may be a camera for use with silver halide photographic film. Also, a lens moving device of the invention may be used in any suitable optical instrument, such as a projector.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens moving device comprising:
   a movable lens movable in a direction of an optical axis;
   a guide rod for guiding movement of said movable lens;
   a base panel having a light path opening positioned on said optical axis;
   first and second interception blades, disposed to overlap with one another on said optical axis, movable in an associated manner in a direction crosswise to said optical axis and between open and shut positions, for shutting said light path opening when in said shut position, and for opening said light path opening when in said open position;
   a slot, formed in at least said first interception blade, for receiving insertion of said guide rod, and for allowing said first interception blade to move.

2. A lens moving device as defined in claim 1, wherein said slot is formed to extend in a predetermined direction to keep said guide rod slidable relatively, and to guide slide of said interception blades in said predetermined direction.

3. A lens moving device as defined in claim 2, further comprising a rail portion formed with one surface of said base panel, for keeping said interception blades slidable, said light path opening being positioned in a middle of said rail portion.

4. A lens moving device as defined in claim 3, further comprising:
   a stationary lens; and
   a fastening surface, formed with an outside of said rail portion, for receiving said stationary lens secured thereto, said light path opening being positioned in said fastening surface.

5. A lens moving device as defined in claim 4, wherein said movable lens is in each of positions in front of and behind said interception blades with respect to said optical axis direction;
   said guide rod has a length for guiding movement of said movable lens.

* * * * *